United States Patent
Jariwala et al.

(10) Patent No.: US 6,960,642 B2
(45) Date of Patent: Nov. 1, 2005

(54) WATER- AND OIL-REPELLENT COMPOSITIONS

(75) Inventors: Chetan P. Jariwala, Woodbury, MN (US); Thomas P. Klun, Lakeland, MN (US); Jeffrey G. Linert, Woodbury, MN (US); Richard M. Stern, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 85 days.

(21) Appl. No.: 10/339,418

(22) Filed: Jan. 9, 2003

(65) Prior Publication Data

US 2003/0199621 A1 Oct. 23, 2003

Related U.S. Application Data

(62) Division of application No. 09/592,105, filed on Jun. 12, 2000, now Pat. No. 6,586,522.

(51) Int. Cl.$^7$ .................. C08G 63/68; C08G 69/00; C08G 69/44; C08G 75/00; C08G 63/02
(52) U.S. Cl. .................. 528/290; 524/602; 528/272
(58) Field of Search .................. 528/290, 272; 524/602

(56) References Cited

U.S. PATENT DOCUMENTS

| | | | |
|---|---|---|---|
| 2,803,656 A | | 8/1957 | Ahlbrecht et al. |
| 3,255,131 A | * | 6/1966 | Ahlbrecht et al. ............ 528/69 |
| 3,734,962 A | | 5/1973 | Niederprum et al. |
| 3,959,229 A | | 5/1976 | Downing et al. |
| 4,219,625 A | | 8/1980 | Mares et al. |
| 4,958,039 A | | 9/1990 | Pechhold |
| 5,025,052 A | | 6/1991 | Crater et al. |
| 5,145,727 A | | 9/1992 | Potts et al. |
| 5,149,576 A | | 9/1992 | Potts et al. |
| 5,300,357 A | | 4/1994 | Gardiner |
| 5,688,468 A | | 11/1997 | Lu |

FOREIGN PATENT DOCUMENTS

| | | |
|---|---|---|
| EP | 0 113 217 A | 12/1982 |
| EP | 0 913 517 A | 10/1997 |
| JP | 56-165072 | 12/1981 |
| JP | 62-1725 | 1/1987 |
| JP | 62-129310 | 6/1987 |
| JP | 4-272217 | 9/1992 |
| JP | 5-92915 | 3/1997 |
| WO | WO 94/26832 | 11/1994 |
| WO | WO 97/22576 | 6/1997 |
| WO | WO 98/51726 | 11/1998 |

OTHER PUBLICATIONS

Wente, "Superfine Thermoplastic Fibers," Indus. Eng'g Chem. vol. 48, No. 8, pp. 1342–1346 (1956).
Wente, "Manufacture of Superfine Organic Fibers," Naval Research Laboratories Report No. 4364 (1956).
Modern Approaches to Wettability Theory and Application, pp. 332–333, Plenum Press, 1992.
Kirk–Othmer, "Encyclopedia of Chemical Technology," Third Edition, vol. 24, pp. 442–464.
Banks, "Organofluorine Chemicals and their Industrial Applications," Society of Chemical Industry, pp. 226–234.

* cited by examiner

Primary Examiner—Patrick D. Niland
(74) Attorney, Agent, or Firm—Douglas B. Little

(57) ABSTRACT

Fiber, fabric, film, molded or blown article comprising a water- and oil-repellent composition comprising a melt blend of components (a) and (b) in which:

(a) comprises a repellency-imparting, fluorochemical composition comprising at least one fluorine-containing aromatic ester oligomer comprising
  (1) at least two repeat units derived or derivable from the reaction of at least one dicarboxylic acid (or a derivative thereof) and at least one polyol, with the proviso that either the dicarboxylic acid (or derivative) or the polyol (or both) is aromatic or heteroaromatic, and
  (2) fluorochemical endgroups derived or derivable from the reaction of
    (i) the dicarboxylic acid (or derivative) and at least one fluorine-containing monoalcohol, or
    (ii) the polyol and at least one fluorine-containing monocarboxylic acid; and
(b) comprises a treatable substrate material; with the proviso that, when the treatable substrate material comprises a mixture of at least two polymers, the mixture is non-stratifying.

7 Claims, No Drawings

WATER- AND OIL-REPELLENT COMPOSITIONS

This is a divisional Application Ser. No. 09/592,105, filed on Jun. 12, 2000, now U.S. Pat. No. 6,586,522.

FIELD OF THE INVENTION

This invention relates to compositions that exhibit water and oil repellency characteristics. This invention further relates to fibers, films, fabrics, coatings, and molded or blown articles comprising the compositions. In other aspects, this invention also relates to processes for imparting water and oil repellency characteristics to substrates, to a topical treatment composition for use in at least one such process, and to certain novel fluorochemical additives for use in the compositions and processes.

BACKGROUND OF THE INVENTION

Synthetic polymeric fibers have been used to make a variety of products, including carpets, drapery material, upholstery, and clothing. Often, however, such fibers (and the resulting products) have suffered from an inherent lack of water and oil repellency. Since fluorochemical groups are characteristically hydrophobic and oleophobic, various fluorochemicals have been developed for application to the polymeric fibers to impart water and oil repellency (as well as soil resistance) thereto. These fluorochemicals have most often been applied topically (for example, by spraying, padding, or finish bath immersion), but some fluorochemicals have also been useful as polymer melt additives.

In order for a fluorochemical to have utility as a polymer melt additive, it must be sufficiently thermally stable and non-volatile to withstand typical melt processing conditions. It must also be compatible with the polymer at the melt processing temperatures (to enable blending) and should preferably be able to migrate to the polymer surface as the temperature is lowered, so as to minimize the amount of fluorochemical needed to modify surface properties. This preference for migration capability has tended to limit the size of the fluorochemical molecule that can be utilized, effectively eliminating high molecular weight polymeric fluorochemicals from consideration.

Since some synthetic polymers such as polyesters require extremely high melt processing temperatures (for example, in the range of about 250–300° C.), it has been difficult to find fluorochemicals that are not only compatible with such polymers and capable of migration within them, but that are also sufficiently thermally stable. Although useful topical fluorochemical treatments have been developed, such treatments have often lacked the durability needed for some applications (for example, clothing, carpets, and upholstery), have tended to provide uneven or non-uniform coverage, and have often involved the use of environmentally unfriendly solvents. Even if water-based topical treatments are utilized, expenses are incurred for the purchase and maintenance of coating equipment.

Thus, there remains a need in the art for fluorochemicals that can successfully function as melt additives for high-melting polymers such as polyesters

SUMMARY OF THE INVENTION

Briefly, in one aspect, this invention provides a water- and oil-repellent composition comprising (a) a repellency-imparting, fluorochemical composition comprising at least one fluorine-containing aromatic ester oligomer comprising (1) at least two polymerized (repeat) units derived or derivable from the reaction of at least one dicarboxylic acid (or a derivative thereof, for example, a dicarboxylic acid halide, a dicarboxylic acid anhydride, or a dicarboxylic acid ester) and at least one polyol, with the proviso that at least one of the dicarboxylic acid (or derivative) and the polyol is aromatic or heteroaromatic (that is, either the carbonyl moiety of the carboxylic acid groups of the dicarboxylic acid, or the hydroxyl groups of the polyol, or both are bonded directly to at least one aromatic or heteroaromatic ring ("directly ring-bonded")) and (2) fluorochemical endgroups derived or derivable from the reaction of
   (i) the dicarboxylic acid (or derivative) and at least one fluorine-containing monoalcohol or
   (ii) the polyol and at least one fluorine-containing monocarboxylic acid (or derivative); and (b) a treatable substrate; with the proviso that, when the treatable substrate comprises a mixture of at least two polymers, the mixture is non-stratifying.

As used herein, the term "oligomer" means a polymer molecule consisting of only a few (for example, from 2 to about 20) polymerized (repeat) units, and the term "non-stratifying" means that the polymers in a polymer mixture are sufficiently compatible that a melt blend thereof does not phase separate to form two or more polymeric layers of different composition. Preferably, the polyol is a diol, and the treatable substrate comprises at least one thermoplastic or thermoset polymer (more preferably, a thermoplastic polymer; even more preferably, a thermoplastic polymer having a melting point above about 150° C.; most preferably, a polyester).

It has been discovered that the above-described, aromatic ester oligomer-containing, fluorochemical composition can be used to impart water and oil repellency, soil resistance, solvent resistance, and release properties to a variety of substrates. The substrates can be treated either by topical (external) application of the fluorochemical composition or by using the fluorochemical composition as a melt (internal) additive. Surprisingly, in spite of its higher molecular weight component(s), the aromatic ester oligomer-containing fluorochemical composition provides repellency properties comparable to or better than those imparted by the corresponding monomeric composition (containing only aromatic ester monomer(s) or compound(s)). Such repellency properties can thus be achieved without the need for careful molecular weight control.

In addition, certain preferred embodiments of the fluorochemical composition (for example, those comprising aromatic ester oligomer(s) having sulfonamido-linked fluorochemical endgroups) exhibit exceptionally high thermal stabilities (being stable at temperatures up to, for example, about 300° C.). These embodiments are thus particularly well-suited for use as melt additives for thermoplastic polymers and, in particular, meet the need in the art for fluorochemicals that can successfully function as melt additives for high-melting polymers such as polyesters and polyamides. The preferred fluorochemical compositions are not only compatible with such high-melting polymers and able to meet their stringent thermal stability requirements, but they are also able to impart durable, uniform water and oil repellency properties to the polymers for about the same cost as topical treatments.

In other aspects, this invention also provides fiber, fabric, film, a coating, and a molded or blown article comprising the water- and oil-repellent composition of the invention; processes for imparting repellency characteristics to a substrate, for example, by bulk addition or by topical treatment; a topical treatment composition comprising (a) the above-described repellency-imparting, fluorochemical composition and (b) at least one liquid, organic or aqueous vehicle; and a novel repellency-imparting, fluorochemical composition comprising at least one fluorine-containing, aromatic ester compound or oligomer comprising (a) at least one repeat or repeatable unit derived or derivable from the reaction of at least one dicarboxylic acid (or a derivative thereof) and at least one polyol, with the proviso that at least one of the dicarboxylic acid (or derivative) and the polyol (that is, either the dicarboxylic acid or the polyol or both) is aromatic or heteroaromatic and (b) sulfonamido group-containing, fluorochemical endgroups derived or derivable from the reaction of (i) the dicarboxylic acid (or derivative) and at least one fluorine-containing, sulfonamido group-containing monoalcohol or (ii) the polyol and at least one fluorine-containing, sulfonamido group-containing monocarboxylic acid.

DETAILED DESCRIPTION
Fluorochemical Composition

The repellency-imparting, fluorochemical composition used in preparing the water- and oil-repellent composition of the invention comprises at least one fluorine-containing aromatic ester oligomer. The oligomer comprises or consists essentially of (1) at least two repeat units derived or derivable from the reaction of at least one dicarboxylic acid (or a derivative thereof, for example, a dicarboxylic acid halide, a dicarboxylic acid anhydride, or a dicarboxylic acid ester) and at least one polyol, with the proviso that either the dicarboxylic acid (or derivative) or the polyol (or both) is aromatic or heteroaromatic and (2) fluorochemical endgroups derived or derivable from the reaction of (i) the dicarboxylic acid (or derivative) and at least one fluorine-containing monoalcohol or (ii) the polyol and at least one fluorine-containing monocarboxylic acid (or derivative).

Thus, the fluorochemical composition can comprise a single fluorine-containing aromatic ester oligomer having a certain number of the specified repeat units (a number greater than or equal to two; generally, a number in the range of 2 to about 20; preferably, 2 to 8; more preferably, 3 to 6; most preferably, 3 or 4) or it can comprise a mixture of such oligomers of varying numbers of repeat units. The composition can further contain fluorine-containing aromatic ester compounds having fewer than two such repeat or repeatable units, as well as one or more fluorine-free extenders or one or more conventional additives such as those described infra. Useful fluorine-free extender compounds include, for example, siloxanes, (meth)acrylate and substituted acrylate polymers and copolymers, N-methylolacrylamide-containing acrylate polymers, urethanes, blocked isocyanate-containing polymers and oligomers, condensates or precondensates of urea or melamine with formaldehyde, glyoxal resins, condensates of fatty acids with melamine or urea derivatives, condensates of fatty acids with polyamides and their epichlorohydrin adducts, waxes, polyethylene, chlorinated polyethylene, alkyl ketene dimers, esters, and amides, and mixtures thereof. The relative amount of extender compound to fluorine-containing oligomer is not critical. However, the overall fluorochemical composition generally contains, relative to the amount of solids present in the system, at least about 3 weight percent, preferably at least about 5 weight percent, carbon-bound fluorine in the form of fluorochemical groups.

Preferably, the composition comprises a mixture of aromatic ester molecules of varying structure, more preferably, a mixture of at least one aromatic ester oligomer (2 or more repeat units) and at least one aromatic ester compound (0 or 1 repeatable unit). Most preferably, the composition comprises a mixture of four different aromatic ester molecules, namely, those having 0, 1, 2, and 3 repeat or repeatable units (that is, a mixture of the two aromatic ester oligomers that have 2 and 3 repeat units, respectively, and the two aromatic ester compounds that have 0 and 1 repeatable unit, respectively).

Preferred classes of fluorine-containing aromatic ester oligomers are those represented by the following formulas

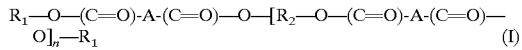

(I)

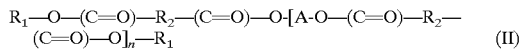

(II)

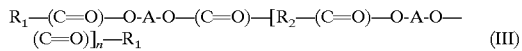

(III)

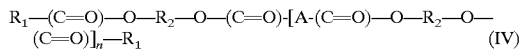

(IV)

(with those of Formulas I and IV being more preferred, and those of Formula I most preferred) wherein each $R_1$ is independently the residue of at least one fluorine-containing monoalcohol or fluorine-containing monocarboxylic acid (or derivative); each A and each $R_2$ independently comprises at least one aliphatic, heteroaliphatic, saturated alicyclic, saturated heteroalicyclic, aromatic, heteroaromatic, or polymeric moiety; and n is an integer of at least two; with the proviso that either A or $R_2$ or both (preferably, A) comprises an aromatic or heteroaromatic moiety that is directly ring-bonded to the adjacent ester groups shown in Formulas I–IV. The aromatic or heteroaromatic moiety can comprise one or more rings (which can be fused or can be separated by one or more spacer groups, for example, an aliphatic group), and the adjacent ester groups can be bonded to a single ring or to separate rings of the aromatic or heteroaromatic moiety. The rings can be substituted with other groups that do not interfere with the reactivity of carboxylic acid or hydroxyl groups, do not cause undesirable side reactions, and do not cause decomposition of the resulting fluorochemical composition during use (for example, one or more halogen, alkyl, alkoxy, or aryl groups substituted for one or more ring-bonded hydrogen atoms). The polymeric moiety preferably has a number average molecular weight in the range of about 80 to about 2000 (more preferably, about 80 to about 1000).

Preferably, $R_1$ comprises at least one fluorochemical group, $R_f$, that is fluoroaliphatic or fluoroalicyclic. More preferably, $R_f$ contains a perfluorinated carbon chain having from 3 to about 20 carbon atoms (more preferably from about 4 to about 12 carbon atoms; most preferably, about 8 carbon atoms). A is preferably phenylene, napthalene, biphenylene, bis(phenylene)methylene, or bis(phenylene) propylidene (more preferably, phenylene; most preferably, meta- or para-phenylene). $R_2$ is preferably a divalent aliphatic, saturated alicyclic, aromatic, aliphatic polyester, polydialkylsiloxane, or poly(oxyalkylene) moiety; more preferably, a divalent aliphatic, aromatic, aliphatic polyester, polydimethylsiloxane, or poly(oxyalkylene) moiety; even more preferably, hexylene, ethylene, propylene, neopentylene, ethyleneoxyethylene, bis(ethyleneoxycarbonyl)phenylene, polycaprolactone, polyoxyethylene, polyoxypropylene, or polydimethylsiloxane; most preferably, hexylene, ethylene, or propylene. n is generally an integer in the range of 2 to about 10; preferably, 2 to 8; more preferably, 3 to 6; most preferably, 3 to 4.

Preferred classes of fluorine-containing aromatic ester compounds are those that can be represented by Formulas I–IV above (more preferably, Formulas I and IV; most preferably, Formula I), wherein n is an integer of 0 or 1, and $R_1$, A, and $R_2$ are as defined above.

The repellency-imparting, fluorochemical composition used in preparing the water- and oil-repellent composition of the invention can be prepared by using procedures and apparatus known to those skilled in the art of esterification and ester exchange reactions. For example, the fluorochemical composition can be prepared by (a) simultaneously reacting the fluorine-containing monoalcohol or monocarboxylic acid with the polyol and the dicarboxylic acid (or derivative); (b) first reacting the polyol with the dicarboxylic acid (or derivative), and then reacting the resulting mixture with the fluorine-containing monoalcohol or monocarboxylic acid; or (c) first reacting either the fluorine-containing monoalcohol with the dicarboxylic acid (or derivative) or the fluorine-containing monocarboxylic acid with the polyol, and then reacting the resulting mixture with the remaining reactant. Method (c) is generally preferred, because the probability of complete consumption of the fluorine-containing reactant can be higher than for Methods (a) and (b), and because it is believed that this method can produce a broader range of oligomers than Methods (a) and (b).

When a fluorine-containing monoalcohol is used to prepare fluorine-containing aromatic ester oligomers of Formulas I and II above, the molar ratio of monoalcohol to dicarboxylic acid can be in the range of about 1:1 to 1:10 (preferably, about 1:1 to 1:7; more preferably, about 1:1 to 1:2; and most preferably, about 1:1 to 1:1.5). The ratio of dicarboxylic acid to polyol can then be in the range of about 2:1 to 1:1. Preferably, the ratio of the total number of equivalents of hydroxyl groups to the total number of equivalents of carboxyl groups is about 1:1.

Similarly, when a fluorine-containing monocarboxylic acid is used to prepare fluorine-containing aromatic ester oligomers of Formulas III and IV above, the ratio of monocarboxylic acid to polyol can be in the range of about 1:1 to 1:10 (preferably, about 1:1 to 1:7; more preferably, about 1:1 to 1:2; and most preferably, about 1:1 to 1:1.5). The ratio of polyol to dicarboxylic acid can then be in the range of about 2:1 to 1:1, and the ratio of the total number of equivalents of hydroxyl groups to the total number of equivalents of carboxyl groups is preferably about 1:1.

The reactions can be carried out in solution or in the molten state (using commonly-used solvents and/or equipment), generally under atmospheric pressure and at temperatures sufficient to maintain the reactants in solution or in the melt. For example, temperatures in the range of about 100–240° C. (preferably, about 115–210° C.; more preferably, about 120–170° C.) can generally be utilized. Removal of solvent or byproduct HCl, if present, can be conducted at reduced pressures, for example, using a vacuum equivalent to 508 mm Hg or less.

Fluorine-containing monoalcohols and monocarboxylic acids suitable for use in preparing the repellency-imparting, fluorochemical composition include those that comprise at least one of the above-described $R_f$ groups. The $R_f$ groups can contain straight chain, branched chain, or cyclic fluorinated alkylene groups or any combination thereof. The $R_f$ groups can optionally contain catenary heteroatoms (that is, heteroatoms bonded to carbon atoms in the carbon-carbon chain so as to form a carbon-heteroatom-carbon chain) such as oxygen, divalent or hexavalent sulfur, or nitrogen. Fully-fluorinated groups are generally preferred, but hydrogen or chlorine atoms can also be present as substituents, provided that no more than one atom of either is present for every two carbon atoms. It is additionally preferred that any $R_f$ group contain at least about 40% fluorine by weight, more preferably at least about 50% fluorine by weight. The terminal portion of the group is generally fully-fluorinated, preferably containing at least 7 fluorine atoms, e.g., $CF_3CF_2CF_2$—, $(CF_3)_2CF$—, $SF_5CF_2$—. Perfluorinated aliphatic groups (i.e., those of the formula $C_nF_{2n+1}$—) are the most preferred $R_f$ groups. Preferably, the fluorine-containing monoalcohols and monocarboxylic acids comprise at least one sulfonamido group, as this group appears to enhance the thermal stability of the resulting fluorochemical composition.

Useful fluorine-containing monoalcohols include (1) those having the general formula $R_f(CH_2)_nCH_2OH$, wherein $R_f$ is as defined above and n is an integer from 0 to about 20 (preferably from 0 to about 12, more preferably from zero to four, most preferably zero or one); (2) those having the general formula $R_fSO_2N(R_1)R_2OH$, wherein $R_f$ is as defined above, $R_1$ is hydrogen or a monovalent alkyl (straight chain or branched), cycloalkyl, or aryl radical having from 1 to about 12 carbon atoms (preferably from 1 to about 8 carbon atoms, more preferably from one to about four carbon atoms), and $R_2$ is a divalent alkyl (straight chain or branched) or cycloalkyl radical having from 1 to about 12 carbon atoms (preferably from 1 to about 8 carbon atoms, more preferably from 1 to about 4 carbon atoms) and which can contain heteroatoms such as divalent oxygen, divalent sulfur, trivalent nitrogen, or hexavalent sulfur; (3) those having the general formula $R_fQR_2OH$, wherein $R_f$ is as defined above, Q is —$CON(R_1)$—, —$SO_2$—, or carbonyl, and $R_1$ and $R_2$ are as defined above; and (4) those having the general formula $R_fR_2XR_2OH$, wherein $R_f$ is as defined above, each $R_2$ is independently selected from the group defined above for $R_2$, and X is divalent oxygen or sulfur or —$N(R_1)$—, where $R_1$ is as defined above.

Representative examples of useful fluorine-containing monoalcohols include:

$CF_3(CF_2)_3SO_2N(CH_3)CH_2CH_2OH$,
$CF_3(CF_2)_3SO_2N(CH_3)CH(CH_3)CH_2OH$,
$CF_3(CF_2)_3SO_2N(CH_3)CH_2CH(CH_3)OH$,
$CF_3(CF_2)_3SO_2N(CH_2CH_3)CH_2CH_2OH$,
$C_6F_{13}SO_2N(CH_3)(CH_2)_4OH$,
$CF_3(CF_2)_7SO_2N(H)(CH_2)_3OH$,
$CF_3(CF_2)_7SO_2N(CH_3)CH_2CH_2OH$,
$CF_3(CF_2)_7SO_2N(CH_3)(CH_2)_4OH$,
$C_8F_{17}SO_2N(CH_3)(CH_2)_{11}OH$,
$CF_3(CF_2)_7SO_2N(CH_2CH_3)CH_2CH_2OH$,
$CF_3(CF_2)_7SO_2N(C_2H_5)(CH_2)_6OH$,
$CF_3(CF_2)_7SO_2N(C_2H_5)(CH_2)_{11}OH$,
$CF_3(CF_2)_6SO_2N(C_3H_7)CH_2OCH_2CH_2CH_2OH$,
$CF_3(CF_2)_7SO_2N(CH_2CH_2CH_3)CH_2CH_2OH$,
$CF_3(CF_2)_9SO_2N(CH_2CH_2CH_3)CH_2CH_2OH$,
$CF_3(CF_2)_7SO_2N(C_4H_9)CH_2CH_2OH$,
$CF_3(CF_2)_7SO_2N(C_4H_9)(CH_2)_4OH$,
2-[N-methyl-2-(4-perfluoro-(2,6-diethylmorpholinyl)) perfluoroethylsulfonamido]ethanol,
$C_7F_{15}CON(CH_3)CH_2CH_2OH$,
$C_7F_{15}CON(C_2H_5)CH_2CH_2OH$,
$C_8F_{17}CON(C_2H_5)CH_2CH_2OH$,
$C_8F_{17}CON(CH_3)(CH_2)_{11}OH$,
$C_2F_5O(C_2F_4O)_3CF_2CONHC_2H_4OH$,
$R_f[OCF(CF_3)CF_2]_{1-6}OCF(CF_3)CH_2OH$
$CF_3CF(CF_2Cl)(CF_2CF_2)_6CF_2CON(CH_3)CH_2CH_2OH$,
$CF_3(CF_2)_6SO_2CH_2CH_2OH$,
$CF_3(CF_2)_7SO_2CH_2CH_2OH$, $C_5F_{11}COOCH_2CH_2OH$,
$CF_3(CF_2)_6COOCH_2CH_2OH$,
$C_8F_{17}COOCH_2CH_2OH$,
$C_8F_{17}(CH_2)_{11}N(C_2H_5)CH_2CH_2OH$,
$C_3F_7CH_2OH$,
$CF_3(CF_2)_6CH_2OH$,
$CF_3(CF_2)_6CH_2CH_2CH_2OH$,
$CF_3(CF_2)_7CH_2CH_2OH$,
$CF_3(CF_2)_7CH_2CH_2SO_2N(CH_3)CH_2CH_2OH$,
$CF_3(CF_2)_5CH_2CH_2SO_2N(CH_3)CH_2CH_2OH$,
$CF_3(CF_2)_3CH_2CH_2SO_2N(CH_3)CH_2CH_2OH$,
$CF_3(CF_2)_7CH_2CH_2CH_2OH$,
$CF_3(CF_2)_7(CH_2)_{11}CH_2OH$,
$CF_3C(CF_2H)F(CF_2)_{10}(CH_2)_2OH$,
$CF_3C(CF_2Cl)F(CF_2)_{10}(CH_2)_2OH$,
$R_f(CH_2)_2S(CH_2)_2OH$,
$R_f(CH_2)_4S(CH_2)_2OH$,
$R_f(CH_2)_2S(CH_2)_3OH$,
$R_f(CH_2)_2SCH(CH_3)CH_2OH$,
$R_f(CH_2)_4SCH(CH_3)CH_2OH$,
$R_f(CH_2CH(CH_3)S(CH_2)_2OH$,
$R_f(CH_2)_2S(CH_2)_{11}OH$,
$R_f(CH_2)_2S(CH_2)_3O(CH_2)_2OH$,
$R_f(CH_2)_3O(CH_2)_2OH$,
$R_f(CH_2)_3SCH(CH_3)CH_2OH$, and the like, and mixtures thereof, wherein $R_f$ is a perfluoroalkyl group of 3–16 carbon atoms. If desired, rather than using such alcohols, similar thiols can be utilized.

Preferred fluorine-containing monoalcohols include 1,1-dihydroperfluorooctanol, 1,1,2,2-tetrahydroperfluorodecanol, 1,1,2,2,3,3-hexahydroperfluorodecanol, 2-(N-ethylperfluorooctanesulfonamido)ethanol (EtFOSE), 2-(N-methylperfluorooctanesulfonamido)ethanol (MeFOSE), 2-(N-butylperfluorooctanesulfonamido)ethanol (BuFOSE), 2-(N-ethylperfluorobutanesulfonamido)ethanol, 2-(N-methylperfluorobutanesulfonamido)ethanol, 2-(N-n-propylperfluorodecanesulfonamido)ethanol, N-ethyl-N-(2-hydroxyethyl) perfluoroheptanamide, Zonyl™ BA fluorochemical telomer alcohol (DuPont Chemicals; Wilmington, Del.), and the like, and mixtures thereof.

Useful fluorine-containing monocarboxylic acids include (1) those having the formula $R_f(CH_2)_n(X)_p(CH_2)_mCOOH$, wherein $R_f$ is as defined above, n and m are independently integers of 0 to 14 (preferably 0–8, more preferably 0–4), X is divalent oxygen or sulfur, and p is an integer of 0 or 1, and (2) those having the formula $R_fQR'COOH$, wherein $R_f$ is as defined above, R' is a divalent alkyl (straight chain or branched) or cycloalkyl radical having from 1 to about 12 carbon atoms (preferably from 1 to about 8 carbon atoms, more preferably from 1 to about 4 carbon atoms), and the divalent linking group Q is —$SO_2N(R'')$— or —$CON(R'')$— wherein R" is a monovalent alkyl (straight chain or branched), cycloalkyl, or aryl radical having from 1 to about 12 carbon atoms (preferably from 1 to about 8 carbon atoms, more preferably from 1 to about 4 carbon atoms).

Representative examples of useful fluorine-containing monocarboxylic acids include perfluorobutanoic ($C_3F_7COOH$), perfluoroisobutanoic (($CF_3)_2CFCOOH$), hydroperfluorobutanoic ($C_3F_6HCOOH$), perfluoropentanoic ($C_4F_9COOH$), hydroperfluoropentanoic ($C_4F_8HCOOH$), perfluorohexanoic ($C_5F_{11}COOH$), hydroperfluorohexanoic ($C_5F_{10}HCOOH$), perfluorcyclohexanyl carboxylic ($C_6F_{11}COOH$), perfluoroheptanoic ($C_6F_{13}COOH$), perfluorooctanoic ($C_7F_{15}COOH$), perfluorononanoic ($C_8F_{17}COOH$), omega-hydroperfluorononanoic ($C_8F_{16}HCOOH$), perfluorodecanoic ($C_9F_{19}COOH$), omega-hydroperfluoroundecanoic ($C_{10}F_{20}HCOOH$), perfluorododecanoic ($C_{11}F_{23}COOH$), perfluorotetradecanoic ($C_{13}F_{27}COOH$), perfluorohexadecanoic ($C_{15}F_{31}COOH$), perfluorobicyclo(4.2.0)-3H-4-octanoic acid, 2-perfluorooctylacetic, 5-perfluoroheptypentanoic, 11-perfluoroheptylundecanoic, perfluoro(3-ethoxypropionic), perfluoro(3-propoxypropionic), perfluoro(3-butoxypropionic), perfluoro(3-pentoxypropionic), perfluoro(3-hexoxypropionic), perfluoro(3-heptoxypropionic), $R_f[OCF(CF_3)CF_2]_{1-6}OCF(CF_3)COOH$ where $R_f$ is a perfluroalkyl group of 3–16 carbon atoms perfluoro(3-octoxypropionic), 12-perfluoroisopropoxy-perfluorododecanoic, 3-(3-perfluoroheptylpropoxy) propanoic, 3-(3-perfluoroheptylpropylthio)propanoic, 4-(8-perfluoroisopropoxyperfluorooctyl)butanoic, 4-(4-perfluoroisopropoxyperfluorobutyl)butanoic, 4-(6-bis(perfluoroisopropyl)fluoromethoxyperfluorohexyl)butanoic, 12-(16-bis(perfluoroisopropyl)fluoromethoxy)perfluorohexadecyl)dodecanoic, 4-(bis(perfluoroisopropyl) fluoromethoxy)perfluorobutanoic, 12-(2-perfluoroisopropoxyperfluoroethyl)dodecanoic, 6-(2-perfluorocyclobutoxyperfluoroethyl)hexanoic, 4-bis(perfluoroisopropyl)fluoromethoxy)perfluorobutanoic, 4-(2-bis(perfluoroisopropyl)fluoromethoxyperfluoroethyl)butanoic, 11-(N-ethyl)perfluoroheptanecarboxamido)undecanoic, 2-(N-(ethyl)perfluorooctanesulfonamido)acetic, 2-(N-(ethyl)perfluorohexanesulfonamido)acetic, 2-(N-(ethyl) perfluorobutanesulfonamido)acetic 2-(N-(ethyl) perfluorodecanesulfonamido)acetic, 2-(N-(ethyl) perfluorododecanesulfonamido)acetic, 2-(N-(methyl) perfluorooctanesulfonamido)acetic, and 2-(N-(methyl) perfluorobutanesulfonamido)acetic, and the like, and mixtures thereof.

Preferred fluorine-containing monocarboxylic acids include 2-(N-(ethyl)perfluorooctanesulfonamido)acetic, 2-(N-(ethyl)perfluorohexanesulfonamido)acetic, 2-(N-(ethyl)perfluorobutanesulfonamido)acetic 2-(N-(ethyl) perfluorodecanesulfonamido)acetic, 2-(N-(ethyl) perfluorododecanesulfonamido)acetic, 2-(N-(methyl) perfluorooctanesulfonamido)acetic, 2-(N-(methyl) perfluorobutanesulfonamido)acetic, 2-perfluorooctylacetic, perfluorooctanoic ($C_7F_{15}COOH$), perfluorononanoic ($C_8F_{17}COOH$), and the like, and mixtures thereof.

Most preferred fluorine-containing monoalcohols and monocarboxylic acids include 2-(N-ethylperfluorooctanesulfonamido)ethanol (EtFOSE), 2-(N-methylperfluorooctanesulfonamido)ethanol (MeFOSE), 2-(N-butylperfluorooctanesulfonamido)ethanol (BuFOSE), 2-(N-methylperfluorobutanesulfonamido)ethanol, 2-(N-(ethyl)perfluorooctanesulfonamido)acetic acid, and mixtures thereof. If desired, monoalcohol(s) or monocarboxylic acid(s) that are not fluorine-containing can be utilized in addition to the fluorine-containing monoalcohol(s) or monocarboxylic acid(s) as a portion of the total monoalcohol or monocarboxylic acid charge (for example, in amounts up to about 50 mole percent of the total or even higher—for example, as high as about 75 mole percent).

Dicarboxylic acids and derivatives thereof (for example, dicarboxylic acid halides, dicarboxylic acid anhydrides, and dicarboxylic acid esters) suitable for use in preparing the repellency-imparting, fluorochemical composition include those that comprise at least one aliphatic, heteroaliphatic (that is, containing in-chain heteroatoms, such as nitrogen, oxygen, or sulfur), saturated alicyclic, saturated heteroalicyclic, aromatic, heteroaromatic, or polymeric moiety. The dicarboxylic acids can optionally contain one or more "non-interfering" groups (groups that do not interfere with the reactivity of the carboxylic acid groups, do not cause undesirable side reactions, and do not cause decomposition of the resulting fluorochemical composition), for example, alkyl, sulfonate, ester, ether, halo, haloalkyl, amide, or carbamate groups. Preferably, the dicarboxylic acids (or derivatives) are aromatic or aliphatic in nature, more preferably, aromatic.

Dicarboxylic acid derivatives are sometimes preferred over dicarboxylic acids for a variety of reasons. For example, acid halides provide both relatively fast reaction rates and reactions that tend to go to completion. The resulting HCl is volatile and can be removed under vacuum or by other removal means, such as by water washing.

For applications in which evolution of HCl is undesirable, a lower alkyl ester of a dicarboxylic acid can be used. Use of such lower alkyl esters can facilitate processing, due to their lower melting points and greater solubility in some solvents (relative to the corresponding acids). Continuous removal of the resulting lower alkyl alcohol can be employed to bring the reaction to completion. A catalyst can also be used and can be selected so as to be removable or deactivatable after reaction is complete, or so as to cause minimal decomposition of the resulting fluorochemical composition under use conditions.

Anhydrides can also be used. Particularly useful anhydride derivatives of dicarboxylic acids are cyclic anhydrides, which react relatively rapidly with an alcohol to form an ester and a carboxylic acid group. This allows a preponderance of monoester/monocarboxylic acid to be formed from the reaction of the cyclic anhydride with one alcohol (such as the fluorine-containing monoalcohol), followed by reaction of the remaining carboxylic acid groups with a second alcohol (such as the polyol). Alternatively, the remaining carboxylic acid groups can first be converted to the corresponding acid halide and then reacted with the second alcohol.

Representative examples of suitable dicarboxylic acids and dicarboxylic acid derivatives include the following acids and their corresponding esters, halides, and anhydrides: terephthalic; isophthalic; t-butylisophthalic; 5-chloro-1,3-benzenedicarboxylic; tetrachlorophthalic; phthalic; any of the isomeric naphthalene dicarboxylic acids such as 1,4-, 2,6-, 2,5-, and 2,7-naphthalenedicarboxylic; 5-sulfoisophthalic; 2-sulfoterephthalic; 5-sulfonaphthalene-1,4-dicarboxylic; sulfofluorenedicarboxylic acids such as 9,9-di(2'-carboxyethyl)-fluorene-2-sulfonic acid; 2,2'- and 4,4'-biphenyldicarboxylic; 2,4-, 2,5-, and 2,6-pyridinedicarboxylic; 2,6-dimethyl-3,5-pyridinedicarboxylic; 2-methyl-3,4-quinolinedicarboxylic; 3,4-furandicarboxylic; 2,3-indoledicarboxylic; 4,4'-benzophenone dicarboxylic; 4,4'-diphenylmethanedicarboxylic; 4,4'-diphenylether dicarboxylic; 4,4'-diphenylthioether dicarboxylic; 4,4'-diphenylamine dicarboxylic; 4,4'-diphenylsulfone dicarboxylic; chelidonic; azelaic; maleic; fumaric; itaconic; phenylenediacetic; 2,5-tetrahydrofuranedicarboxylic; 1,5-pent-2-enedioic; adipic; 2-methyleneadipic; 3-methylitaconic; 3,3-dimethylitaconic; sebacic; suberic; pimelic; succinic; benzylsuccinic; sulfosuccinic; gluratic; 2-methyleneglutaric; 2-sulfoglutaric; 3-sulfoglutaric; diglycolic; dilactic; 3,3'-(ethylenedioxy) dipropionic; dodecanedioic; 2-sulfododecanedioic; decanedioic; undecanedicarboxylic; hexadecanedicarboxylic; dimerized fatty acids (such as those obtained by the dimerization of olefinically unsaturated monocarboxylic acids containing 16 to 20 carbon atoms, for example, oleic acid and linoleic acid and the like); 1,2-, 1,4-, and 1,6-cyclohexanedicarboxylic; norbornenedicarboxylic; bi-cyclooctanedicarboxylic; and other aliphatic, heteroaliphatic, aromatic, heteroaromatic, saturated alicyclic, or saturated heteroalicyclic dicarboxylic acids; and the like; and mixtures thereof. Salts (for example, alkali metal salts) of the above-described sulfonic acids can also be used.

Preferred dicarboxylic acids and dicarboxylic acid derivatives include terephthalic, isophthalic, phthalic, 1,4-, 2,5-, 2,6-, and 2,7-naphthalenedicarboxylic, 4,4'-diphenylmethanedicarboxylic, succinic, adipic, pimelic, suberic, and sebacic acids (and derivatives thereof), and the like, and mixtures thereof; with isophthalic, terephthalic, and adipic acids (and derivatives thereof), and mixtures thereof being more preferred. When a non-aromatic polyol is used, the above-cited aromatic dicarboxylic acids (and derivatives thereof) are generally preferred, with isophthalic acid, terephthalic acid, isophthaloyl chloride, terephthaloyl chloride, dimethylisophthalate, dimethylterephthalate, and mixtures thereof being more preferred (due to their good polyester compatibility). When an aromatic polyol is used, the above-cited aliphatic dicarboxylic acids (and derivatives thereof) are generally preferred, with adipic acid and adipoyl chloride (and mixtures thereof) being more preferred.

Polyols suitable for use in preparing the repellency-imparting, fluorochemical composition include those organic polyols that have an average hydroxyl functionality of at least about 2 (preferably, about 2 to 5; more preferably, about 2 to 3; most preferably, about 2, as diols are most preferred). The hydroxyl groups can be primary or secondary, with primary hydroxyl groups being preferred for their greater reactivity. Mixtures of diols with polyols that have an average hydroxyl functionality of about 2.5 to 5 (preferably about 3 to 4; more preferably, about 3) can be used. It is preferred that such mixtures contain no more than about 50 percent by weight of such polyols, more preferably no more than about 30 percent, and most preferably no more than about 10 percent. Preferred mixtures are mixtures of diols and triols.

Suitable polyols include those that comprise at least one aliphatic, heteroaliphatic, saturated alicyclic, saturated heteroalicyclic, aromatic, heteroaromatic, or polymeric moiety. Preferred polyols are aliphatic or polymeric polyols that contain hydroxyl groups as terminal groups or as groups that are pendant from the backbone chain of the polyol. The molecular weight (that is, the number average molecular weight) of the polyol can generally vary from about 60 to about 2000 (preferably, from about 60 to about 1000; more preferably, from about 60 to about 500; most preferably, from about 60 to about 300), and its equivalent weight (that is, the number average equivalent weight) generally can be in the range of about 30 to about 1000 (preferably, from about 30 to about 500; more preferably, from about 30 to about 250). (Polyols of higher equivalent weight may have a tendency to reduce the repellency provided by the fluorochemical composition). Preferred polyols are substantially free of thermally unstable groups and do not decompose or liberate volatile components at temperatures below about 100° C.

Representative examples of suitable non-polymeric polyols include alkylene glycols (for example, 1,2-ethanediol, 1,2-propanediol, 3-chloro-1,2-propanediol, 1,3-propanediol, 1,3-butanediol, 1,4-butanediol, 2-methyl-1,3-propanediol, 2,2-dimethyl-1,3-propanediol (neopentylglycol), 2-ethyl-1,3-propanediol, 2,2-diethyl-1,3-propanediol, 1,5-pentanediol, 2-ethyl-1,3-pentanediol, 2,2,4-trimethyl-1,3-pentanediol, 3-methyl-1,5-pentanediol, 1,2-, 1,5-, and 1,6-hexanediol, 2-ethyl- 1,6-hexanediol, bis(hydroxymethyl)

cyclohexane, 1,8-octanediol, bicyclo-octanediol, 1,10-decanediol, tricyclo-decanediol, norbornanediol, and 1,18-dihydroxyoctadecane); polyhydroxyalkanes (for example, glycerine, trimethylolethane, trimethylolpropane, 2-ethyl-2-(hydroxymethyl)-1,3-propanediol, 1,2,6-hexanetriol, pentaerythritol, quinitol, mannitol, and sorbitol); and other polyhydroxy compounds such as diethylene glycol, triethylene glycol, tetraethylene glycol, tetramethylene glycol, dipropylene glycol, diisopropylene glycol, tripropylene glycol, 1,11-(3,6-dioxaundecane)diol, 1,14-(3,6,9,12-tetraoxatetradecane)diol, 1,8-(3,6-dioxa-2,5,8-trimethyloctane)diol, 1,14-(5,10-dioxatetradecane)diol, castor oil, 2-butyne-1,4-diol, N,N-bis(hydroxyethyl) benzamide, 4,4'-bis(hydroxymethyl)diphenylsulfone, 1,4-benzenedimethanol, 1,3-bis(2-hydroxyethyoxy)benzene, 1,2-, 1,3-, and 1,4-resorcinol, 1,6-, 2,6-, 2,5-, and 2,7-dihydroxynaphthalene, 2,2'- and 4,4'-biphenol, 1,8-dihydroxybiphenyl, 2,4-dihydroxy-6-methyl-pyrimidine, 4,6-dihydroxypyrimidine, 3,6-dihydroxypyridazine, bisphenol A, 4,4'-ethylidenebisphenol, 4,4'-isopropylidenebis(2,6-dimethylphenol), bis(4-hydroxyphenyl)methane, 1,1-bis(4-hydroxyphenyl)-1-phenylethane (bisphenol C), 1,4-bis(2-hydroxyethyl)piperazine, bis(4-hydroxyphenyl) ether, as well as other aliphatic, heteroaliphatic, saturated alicyclic, aromatic, saturated heteroalicyclic, and heteroaromatic polyols, and the like, and mixtures thereof.

Representative examples of useful polymeric polyols include polyoxyethylene, polyoxypropylene, and ethylene oxide-terminated polypropylene glycols and triols of molecular weights from about 200 to about 2000, corresponding to equivalent weights of about 100 to about 1000 for the diols or about 70 to about 700 for triols; polytetramethylene glycols of varying molecular weight; polydialkylsiloxane diols of varying molecular weight; hydroxy-terminated polyesters and hydroxy-terminated polylactones (e.g., polycaprolactone polyols); hydroxy-terminated polyalkadienes (e.g., hydroxyl-terminated polybutadienes); and the like. Mixtures of polymeric polyols can be used if desired.

Useful commercially available polymeric polyols include Carbowax™ poly(ethylene oxide) materials in the number average molecular weight ($M_n$) range of about 200 to about 2000 (available from Union Carbide Corp.); poly(propylene oxide) materials such as PPG-425 (available from Lyondell Chemicals); Bisphenol A ethoxylate, Bisphenol A propyloxylate, and Bisphenol A propoxylate/ethoxylate (available from Sigma-Aldrich); polytetramethylene ether glycols such as Polymeg™ 650 and 1000 (available from Quaker Oats Company) and the Terathane™ polyols (available from DuPont); hydroxyl-terminated polybutadiene resins such as the Poly bd™ materials (available from Elf Atochem); the "PeP" series (available from Wyandotte Chemicals Corporation) of polyoxyalkylene tetrols having secondary hydroxyl groups, for example, "PeP" 450, 550, and 650; polycaprolactone polyols with $M_n$ in the range of about 200 to about 2000 such as Tone™ 0201, 0210, 0301, and 0310 (available from Union Carbide); "Paraplex™ U-148" (available from Rohm and Haas), an aliphatic polyester diol; polyester polyols such as the Multron™ poly(ethyleneadipate)polyols (available from Mobay Chemical Co.); polycarbonate diols such as Duracarb™ 120, a hexanediol carbonate with $M_n$=900 (available from PPG Industries Inc.); and the like; and mixtures thereof.

Preferred polyols include 1,2-ethanediol; 1,2- and 1,3-propanediol; 1,3- and 1,4-butanediol; neopentylglycol; 1,5-pentanediol; 3-methyl- 1,5-pentanediol; 1,2-, 1,5-, and 1,6-hexanediol; bis(hydroxymethyl)cyclohexane; 1,8-octanediol; 1,10-decanediol; di(ethylene glycol); tri(ethylene glycol); tetra(ethylene glycol); di(propylene glycol); di(isopropylene glycol); tri(propylene glycol); polyoxyethylene diols (number average molecular weight of about 200 to about 1500); polyoxypropylene diols (number average molecular weight of about 200 to about 500); polycaprolactone diols (number average molecular weight of about 200 to about 600); resorcinol; hydroquinone; 1,6-, 2,5-, 2,6-, and 2,7-dihydroxynaphthalene; 4,4'-biphenol; bisphenol A; bis(4-hydroxyphenyl)methane; and the like; and mixtures thereof. More preferred are 1,2-ethanediol; 1,2- and 1,3-propanediol; neopentylglycol; 1,2- and 1,6-hexanediol; di(ethylene glycol); poly[di(ethylene glycol) phthalate] diol (having number average molecular weights of, for example, about 350 or about 575); poly(ethylene glycol) diols (having number average molecular weights of, for example, about 200, 300, 400, 600, 900, or 1450); polydimethylsiloxane diol; polypropylene glycol (having a number average molecular weight of, for example, about 425); dimer diol; polycaprolactone diol (having a number average molecular weight of, for example, about 530); bisphenol A; resorcinol; hydroquinone; and mixtures thereof. When non-aromatic dicarboxylic acids are used, the above-cited aromatic polyols are generally preferred, with resorcinol, hydroquinone, and bisphenol A being more preferred, due to their good polyester compatibility.

If desired for particular applications, small amounts of one or more polymeric or non-polymeric chain extenders (for example, diamines) can be utilized, in addition to the above-described reactants, in preparing the fluorochemical composition.

Treatable Substrates

Substrates that can be treated with the above-described repellency-imparting fluorochemical composition to form the water- and oil-repellent composition of the invention generally comprise at least one material selected from the group consisting of synthetic and naturally-occurring organic or inorganic polymers (or the reactive precursors thereof, for example, mono- or multifunctional monomers or oligomers), ceramics, glasses, and ceramic/polymer composites or ceramers (or the reactive precursors thereof); with the proviso that, when the treatable substrate comprises a mixture of at least two polymers, the mixture is non-stratifying. (Stratification is undesirable because the fluorochemical composition may accumulate at the interface of or between the resulting polymer layers, rather than reaching the air interface in substantial quantity.) The substrates can further comprise one or more other materials (for example, metal fibers or fillers such as carbon black or titanium dioxide). All such substrates are suitable for topical treatment.

Suitable synthetic polymers (which can be either thermoplastic or thermoset) include commodity plastics such as, for example, poly(vinyl chloride), polyethylenes (high density, low density, very low density), polypropylene, and polystyrene; engineering plastics such as, for example, polyesters (including, for example, poly(ethylene terephthalate) and poly(butylene terephthalate)), polyamides (aliphatic, amorphous, aromatic), polycarbonates (for example, aromatic polycarbonates such as those derived from bisphenol A), polyoxymethylenes, polyacrylates and polymethacrylates (for example, poly(methyl methacrylate)), some modified polystyrenes (for example, styrene-acrylonitrile (SAN) and acrylonitrile-butadiene-styrene (ABS) copolymers), high-impact polystyrenes (SB), fluoroplastics, and blends such as poly(phenylene oxide)-polystyrene and polycarbonate-ABS; high-performance plastics such as, for example, liquid crystalline polymers (LCPs), polyetherketone (PEEK), polysulfones, polyimides, and polyetherimides; thermosets such as, for example, alkyd resins, phenolic resins, amino resins (for example, melamine and urea resins), epoxy resins, unsaturated polyesters (including so-called vinyl esters), polyurethanes, allylics (for example, polymers derived from allyldiglycolcarbonate), fluoroelastomers, and polyacrylates; and the like and blends thereof. Suitable naturally occurring polymers include proteinaceous materials such as silk, wool, and leather; and cellulosic materials.

Thermoplastic and thermoset polymers, including those described above, are preferred treatable substrates, as such polymers can either be topically treated with the fluorochemical composition or can be combined with it (in bulk) to form a blend. Thermoplastic polymers are more preferred in view of their melt processability. Preferably, the thermoplastic polymers are melt processable at elevated temperatures, for example, above about 150° C. (more preferably, above about 250° C.; even more preferably, above about 280° C.; most preferably, above about 290° C.). Preferred thermoset polymers include polyurethanes, epoxy resins, fluoroelastomers, polyacrylates, polymethacrylates, unsaturated polyesters, and blends thereof. Preferred thermoplastic polymers include, for example, polypropylene, polyethylene, polyacrylates, polymethacrylates, copolymers of ethylene and one or more alpha-olefins (for example, poly(ethylene-butene) and poly(ethylene-octene)), polyesters, polyurethanes, polycarbonates, polyetherimides, polyimides, polyetherketones, polysulfones, polystyrenes, ABS copolymers, polyamides, fluoroplastics, and blends -thereof. More preferred are polypropylene, polyethylene, polyesters, poly(ethylene-octene), polyurethanes, polycarbonates, polyamides, and blends thereof, with polyesters, polycarbonates, polyurethanes, polyamides, and blends thereof being most preferred.

Preparation and Use of Composition

Preferably, the water- and oil-repellent composition of the invention can be prepared by (a) combining the repellency-imparting, fluorochemical composition and at least one thermoplastic polymer (optionally, along with other additives) and then melt processing the resulting combination; or (b) combining the repellency-imparting, fluorochemical composition and at least one thermosetting polymer or ceramer or the reactive precursors thereof (optionally, along with other additives) and then allowing the resulting combination to cure, optionally with the application of heat or actinic radiation. Alternative processes for preparing the water- and oil-repellent composition of the invention include, for example, (c) applying the repellency-imparting, fluorochemical composition to at least a portion of at least one surface of at least one treatable substrate; (d) dissolving the repellency-imparting, fluorochemical composition and at least one treatable substrate in at least one solvent and then casting or coating (for example, on a substrate such as wood or stone) the resulting solution and allowing evaporation of the solvent, optionally with the application of heat; and (e) combining the repellency-imparting, fluorochemical composition and at least one monomer (optionally, along with other additives) and then allowing polymerization of the monomer to occur, optionally in the presence of at least one solvent and optionally with the application of heat or actinic radiation.

To form a melt blend by melt processing, the fluorochemical composition can be, for example, intimately mixed with pelletized or powdered polymer and then melt processed by known methods such as, for example, molding, melt blowing, melt spinning, or melt extrusion. The fluorochemical composition can be mixed directly with the polymer or it can be mixed with the polymer in the form of a "master batch" (concentrate) of the fluorochemical composition in the polymer. If desired, an-organic solution of the fluorochemical composition can be mixed with powdered or pelletized polymer, followed by drying (to remove solvent) and then by melt processing. Alternatively, the fluorochemical composition can be injected into a molten polymer stream to form a blend immediately prior to, for example, extrusion into fibers or films or molding into articles.

After melt processing, an annealing step can be carried out to enhance the development of repellent characteristics. In addition to, or in lieu of, such an annealing step, the melt processed combination (for example, in the form of a film or a fiber) can also be embossed between two heated rolls, one or both of which can be patterned. An annealing step typically is conducted below the melt temperature of the polymer (for example, in the case of polyamide, at about 150–220° C. for a period of about 30 seconds to about 5 minutes).

The fluorochemical composition can be added to thermoplastic or thermosetting polymer (or, alternatively, to other treatable substrate materials) in amounts sufficient to achieve the desired repellency properties for a particular application. The amounts can be determined empirically and can be adjusted as necessary or desired to achieve the repellency properties without compromising the properties of the polymer (or other treatable substrate material). Generally, the fluorochemical composition can be added in amounts ranging from about 0.1 to about 10 percent by weight (preferably, from about 0.5 to about 4 percent; more preferably, from about 0.75 to about 2.5 percent) based on the weight of polymer (or other treatable substrate material).

In topical treatment of a treatable substrate, the fluorochemical composition can be employed alone or in the form of aqueous suspensions, emulsions, or solutions, or as organic solvent (or organic solvent/water) solutions, suspensions, or, emulsions.>Useful organic solvents include chlorinated hydrocarbons, alcohols (for example, isopropyl alcohol), esters, ketones (for example, methyl isobutyl ketone), and mixtures thereof. Generally, the solvent solutions can contain from about 0.1 to about 50 percent, or even up to about 90 percent, by weight non-volatile solids (based on the total weight of the components). Aqueous suspensions, emulsions, or solutions are generally preferred and generally can contain a non-volatile solids content of about 0.1 to about 50 percent, preferably, about 1 to about 10 percent, by weight (based on the total weight of the components). Alternatively, however, topical treatment can be carried out by applying (to at least a portion of at least one surface of at least one treatable substrate) a fluorochemical composition that comprises at least one fluorine-containing aromatic ester oligomer that is liquid at the use or treatment temperature. Such a topical treatment process can involve the use of the neat fluorochemical composition, without added solvent, and is thus preferred from an environmental perspective over the use of organic solvent solutions of the fluorochemical composition.

The topical treatment compositions comprising the fluorochemical composition can be applied to a treatable substrate by standard methods such as, for example, spraying, padding, dipping, roll coating, brushing, or exhaustion (optionally followed by the drying of the treated substrate to remove any remaining water or solvent). The treatable substrate can be in the form of molded or blown articles, sheets, fibers (as such or in aggregated form, for example, yarn, toe, web, or roving, or in the form of fabricated textiles such as carpets), woven and nonwoven fabrics, films, etc. If desired, the fluorochemical composition can be co-applied with conventional fiber treating agents, for example, spin finishes or fiber lubricants.

The topical treatment compositions can be applied in an amount sufficient to achieve the desired repellency properties for a particular application. This amount can be determined empirically and can be adjusted as necessary or desired to achieve the repellency properties without compromising the properties of the treatable substrate.

Any of a wide variety of constructions can be made from the water- and oil-repellent composition of the invention, and such constructions will find utility in any application where some level of repellency characteristics is required. For example, the composition of the invention can be used to prepare films and molded or blown articles, as well as fibers (for example, melt-blown or melt-spun fibers, including microfibers and sheath-core fibers) that can be used to make woven and nonwoven fabrics. Such films, molded or blown articles, fibers, and fabrics exhibit water and oil repellency (and soil resistance) characteristics under a variety of environmental conditions and can be used in a variety of applications.

For example, molded articles comprising the composition of the invention can be prepared by standard methods (for example, by high temperature injection molding) and are particularly useful as, for example, headlamp covers for automobiles, lenses (including eyeglass lenses), casings or circuit boards for electronic devices (for example, computers), screens for display devices, windows (for example, aircraft windows), and the like. Films comprising the composition of the invention can be made by any of the film making methods commonly employed in the art. Such films can be nonporous or porous (the latter including films that are mechanically perforated), with the presence and degree of porosity being selected according to the desired performance characteristics. The films can be used as, for example, photographic films, transparency films for use with overhead projectors, tape backings, substrates for coating, and the like.

Fibers comprising the composition of the invention can be used to make woven or nonwoven fabrics that can be used, for example, in making medical fabrics, medical and industrial apparel, fabrics for use in making clothing, home furnishings such as rugs or carpets, paper machine clothing, and filter media such as chemical process filters or respirators. Nonwoven webs or fabrics can be prepared by processes used in the manufacture of either melt-blown or spunbonded webs. For example, a process similar to that described by Wente in "Superfine Thermoplastic Fibers," Indus. Eng'g Chem. 48, 1342 (1956) or by Wente et al. in "Manufacture of Superfine Organic Fibers," Naval Research Laboratories Report No. 4364 (1954) can be used. Multilayer constructions made from nonwoven fabrics enjoy wide industrial and commercial utility, for example, as medical fabrics. The makeup of the constituent layers of such multilayer constructions can be varied according to the desired end-use characteristics, and the constructions can comprise two or more layers of melt-blown and spunbonded webs in many useful combinations such as those described in U.S. Pat. Nos. 5,145,727 (Potts et al.) and 5,149,576 (Potts et al.), the descriptions of which are incorporated herein by reference. In multi-layer constructions, the fluorochemical composition can be Is used alone in one or more layers or can be used in combination with other additive(s) in one or more layers. Alternatively, the fluorochemical composition and the other additive(s) can each be independently segregated in one or more layers. For example, in a spunbonded/melt-blown/spunbonded ("SMS") three-layer construction, the other additive(s) (for example, antistats) can be used in one or both spunbonded layers, and the fluorochemical composition can be used in the melt-blown layer, to impart both antistatic and repellency characteristics to the overall construction.

The repellency-imparting, fluorochemical composition used in the composition of the invention can also find utility as an additive to coatings (for example, non-stratifying polymer or ceramer coatings). Such coatings can be water- and oil-repellent, and scratch-resistant (as well as soil-resistant) and can be used in the photographic industry or as protective coatings for optical or magnetic recording media.

If desired, the water- and oil-repellent composition of the invention can further contain one or more additives, including those commonly used in the art, for example, dyes, pigments, antioxidants, ultraviolet stabilizers, flame retardants, surfactants, plasticizers, tackifiers, fillers, and mixtures thereof. In particular, performance enhancers (for example, polymers such as polybutylene) can be utilized to improve the repellency characteristics in, for example, melt additive polyolefin applications.

Objects and advantages of this invention are further illustrated by the following examples, but the particular materials and amounts thereof recited in these examples, as well as other conditions and details, should not be construed to unduly limit this invention. In the examples, where weight percent or parts by weight are indicated, these are based on the weight of the entire composition unless indicated otherwise.

EXAMPLES

Glossary

POSF—$C_8F_{17}SO_2F$, perfluorooctanesulfonyl fluoride, commercially available as Fluorad™ FX-8 fluorochemical intermediate from 3M Company.

PBSF—$C_4F_9SO_2F$, Perfluorobutanesulfonyl fluoride, available from Sigma-Aldrich, Milwaukee, Wis.

MeFOSE alcohol—$C_8F_{17}SO_2N(CH_3)CH_2CH_2OH$, having an equivalent weight of 557, can be made in two stages by reacting POSF with methylamine and ethylenechlorohydrin, using a procedure essentially as described in Example 1 of U.S. Pat. No. 2,803,656 (Ahlbrecht et al.), or alternatively by reacting N-methylperfluorooctylsulfonamide with ethylene glycol carbonate, using the procedure essentially as described in Example 7 of U.S. Pat. No. 3,734,962 (Niederprum et at.).

EtFOSE alcohol—$C_8F_{17}SO_2N(C_2H_5)CH_2CH_2OH$, commercially available as Fluorad™ FC-10 fluorochemical alcohol from 3M, St. Paul, Minn.

MeFBSE alcohol—$C_4F_9SO_2N(CH_3)CH_2CH_2OH$, having an equivalent weight of 357, can be made in two stages by reacting PBSF with methylamine and ethylenechlorohydrin, using a procedure essentially as described in Example 1 of U.S. Pat. No. 2,803,656 (Ahlbrecht, et al.).

Zonyl™ BA(N) alcohol—$F(CF_2CF_2)_nCH_2CH_2OH$, having an average molecular weight of 514, commercially available as from E. I du Pont de Nemours & Co., Wilmington, Del.

Empol™ 1008 dimer acid—a distilled and hydrogented dimer acid based on oleic acid, having an acid equivalent weight of 305 as determined by titration, commercially available from Henkel Corp./Emery Group, Cincinnati, Ohio Empol™ 1070 diol—a dimer diol based on oleic acid, commercially available from henkel Corp./Emery Group.

Poly(ethylene glycol) (PEG)—300, 600, 900, and 1450 number average molecular weight, available from Union Carbide, Danbury, Conn.

Tone™ 201—530 molecular weight polycaprolactone available from Union Carbide, Charleston, W. Va.

PET 65-1000—a film grade polyester, polyethylene terephthalate made with dimethyl terephthalate and having an intrinsic viscosity of 0.61.

PS440-200—Morthane™ polyester-based polyurethane resin, commercially available from Morton Thiokol Corp., Chicago, Ill.

PB0400—1-butylene homopolymer of 20 nominal melt index, available from Montell, Houston, Tex.

Test Methods

Test Method I—Thermal Stability Determination

Thermal stability of neat fluorochemical repellents was determined by thermal gravimetric analysis (TGA) under an inert nitrogen atmosphere using a 10° C. per minute temperature ramp. The initial sample weight was recorded, and the sample weight loss at elevated temperatures was determined. Low weight loss indicated good thermal stability, and high weight loss indicated poor thermal stability. This was determined in one or more of the following ways: a) the percent of the initial sample weight remaining at a specific temperature was determined, or b) the temperature at which a specific percent of the initial sample weight remained was determined.

Test Method II—Water Repellency Test

Nonwoven web samples were evaluated for water repellency using 3M Water Repellency Test V for Floorcoverings (February 1994), available from 3M Company. In this test, samples are challenged to penetrations by blends of deionized water and isopropyl alcohol (IPA). Each blend is assigned a rating number as shown below:

| Water Repellency Rating Number | Water/IPA Blend (% by volume) |
|---|---|
| 0 | 100% water |
| 1 | 90/10 water/IPA |
| 2 | 80/20 water/IPA |
| 3 | 70/30 water/IPA |
| 4 | 60/40 water/IPA |
| 5 | 50/50 water/IPA |
| 6 | 40/60 water/IPA |
| 7 | 30/70 water/IPA |
| 8 | 20/80 water/IPA |
| 9 | 10/90 water/IPA |
| 10 | 100% IPA |

In running the Water Repellency Test, a nonwoven web or film sample is placed on a flat, horizontal surface. Five small drops of water or a water/IPA mixture are gently placed at points at least two inches apart on the sample. If, after observing for ten seconds at a 45° angle, four of the five drops are visible as a sphere or a hemisphere, the nonwoven web or film sample is deemed to pass the test. The reported water repellency rating corresponds to the highest numbered water or water/IPA mixture for which the nonwoven sample passes the described test.

It is desirable to have a water repellency rating of at least 4, preferably at least 6.

Test Method III—Oil Repellency Test

Nonwoven web or film samples were evaluated for oil repellency using 3M Oil Repellency Test II (February 1994), available from 3M Company, St. Paul, Minn. In this test, samples are challenged to penetration or droplet spread by oil or oil mixtures of varying surface tensions. Oils and oil mixtures are given a rating corresponding to the following:

| Oil Repellency Rating Number | Oil Composition |
|---|---|
| 0 | (fails Kaydol ™ mineral oil) |
| 1 | Kaydol ™ mineral oil |
| 2 | 65/35 (vol) mineral oil/n-hexadecane |
| 3 | n-hexadecane |
| 4 | n-tetradecane |
| 5 | n-dodecane |
| 6 | n-decane |
| 7 | n-octane |
| 8 | n-heptane |

The Oil Repellency Test is run in the same manner as is the Water Repellency Test, with the reported oil repellency rating corresponding to the highest oil or oil mixture for which the nonwoven web or film sample passes the test.

It is desirable to have an oil repellency rating of at least 1, preferably at least 2.

Test Method IV—Advancing and Receding Contact Angle Determination

Advancing and receding contact angles were determined in water (OmniSolv™ Water WX0004-1 from EM Science, 480 S. Democrat Rd, Gibbstown, N.J. 08027) and hexadecane using a Cahn Instruments DCA System™ at a speed of 80.00 microns/sec and an immersion depth of 8 mm. Values reported are the mean of three measurements. The DCA System is available from Cahn Instruments, 5225 Verona Road, Bldg. 1, Madison, Wis. 53711-4495. A description of dynamic contact angles is found in *Modern Approaches to Wettability Theory and Application*, p.332–333, Plenum Press, 1992.

Test Method V—Peel Force Determination

The force needed to pull 2.54 cm wide Scotch™ Masking Tape 232(a tackified natural rubber based tape available from 3M, St. Paul, Minn.) or 2.54 cm wide Scotch™ Magic™ Tape 810(an acrylic based tape available from 3M, St. Paul, Minn.) from a film was determined by mounting the film to a glass plate with Scotch™ Double Coated Tape 665(an acrylic based tape available from 3M, St. Paul, Minn.) and measuring adhesion using the procedure of ASTM D 3330-90 method "A".

Preparation of Repellent Additives

Fluorochemical Repellent FR-1

Fluorochemical Repellent FR-I (a fluorochemical oxazolidinone) was prepared by reacting N-methylperfluorooctylsulfonamide with epichlorohydrin to form the fluorochemical chlorohydrin, $C_8F_{17}SO_2N(Me)CH(OH)CH_2Cl$, which was further reacted with octadecyl isocyanate at a 1:1 molar ratio followed by ring closure using essentially the same procedure as described in Scheme I of U.S. Pat. No. 5,025,052 (Crater et al.).

Fluorochemical Repellent FR-2

Fluorochemical Repellent FR-2 (a fluorochemical ester) was prepared by esterifying MeFOSE alcohol with Empol™ 1008 dimer acid at a molar ratio of 2:1 using the following procedure. A 500 mL 2-necked round-bottom flask equipped with overhead condenser, thermometer and Dean-Stark trap wrapped with heat tape was charged with 57.8 g (0.190 eq) of Empol™ 1008 dimer acid, 100 g (0.185 eq) of MeFOSE alcohol, 1 g of p-toluenesulfonic acid and 50 g of toluene. The resulting mixture was placed in an oil bath heated to 150° C. The degree of esterification was monitored by measuring the amount of water collected in the Dean-Stark trap and also by using gas chromatography to determine the amount of unreacted fluorochemical alcohol. After 18 hours of reaction, about 2.8 mL of water was collected and a negligible amount of fluorochemical alcohol remained, indicating a complete reaction. The reaction mixture was then cooled to 100° C. and was twice washed with 120 g aliquots of deionized water, the final water wash having a pH of 3. The final wash was removed from the flask by suction, and the reaction mixture was heated to 120° C. at an absolute pressure of about 90 torr to remove volatiles. The resulting product, a brownish solid, was characterized as containing the desired fluorochemical ester by $^1$H and $^{13}$C NMR spectroscopy and thermogravimetric analysis.

Example 1
2:2:1 MeFOSE/Phthalate/Hexanediol Mixture of Fluorine-Containing Aromatic Ester Compounds and Oligomers with 0, 1, 2, and 3 or More Polymerized Units Toluene (255 g), phthalic anhydride (74 g, 0.5 mole, 1 equivalent), 1,6-hexanediol (HDO) (29.5 g, 0.25 mole, 0.5 equivalent) and p-toluene sulfonic acid (pTSA) (7.7 g, 0.041 mole) were combined under a nitrogen atmosphere in a 1000 ml 3-neck flask equipped with a Dean-Stark trap with a condenser, stirrer, bubbler, and temperature controller. The temperature was increased to 115° C. with stirring, and held at this level while water and toluene distilled for one hour. MeFOSE alcohol (280 g, 0.5 mole, 0.5 equivalent) was added, and the reaction was held at 120° C. for 4 hours while water and toluene distilled. The toluene was removed by vacuum (at least about 508 mm Hg) distillation at 130° C. Some of the product (140 g) was poured out into pans and cooled. Remaining product (160 g) was dissolved in 480 g ethyl acetate, and the resulting solution was heated to 70° C. Sodium carbonate (5 g) was added, and the resulting mixture was stirred well for 5 hours. The mixture was filtered hot, and the ethyl acetate was removed by vacuum stripping. Thermal stability of the resulting fluorochemical composition, made up of a mixture of fluorine-containing aromatic ester compounds and oligomers with 0, 1, 2, and 3 or more polymerized units (expected by analogy to Example 8 below) was determined using Test Method Ia and Ib, and the results are shown in Table 1.

Example 2
2:2:1 MeFOSE/Phthalate/Hexanediol Fluorine-Containing Aromatic Ester Compound with 1 Polymerized Unit A mixture of phthalic anhydride (74 g, 0.5 mole, 1 equivalent) and MeFOSE (280 g, 0.5 mole, 0.5 equivalent) was heated for 5 hours at 170° C. The reaction was cooled to room temperature, and 100 g of the reaction mixture was re-melted and poured into a solution of $Na_2CO_3$ (24 g) and water (2 L). The resulting solution was filtered, washed with toluene, and acidified (pH=1.5) with 10% $H_2SO_4$. Upon acidification, a precipitate formed. The precipitate was collected by filtration and found by proton NMR to be mostly the MeFOSE diester. The water filtrate was extracted with ethyl acetate. The ethyl acetate solutions were dried with $MgSO_4$ and filtered, and the ethyl acetate evaporated to leave MeFOSE monoester.

The MeFOSE monoester (55 g, 0.077 mole, 0.077 equivalent) was heated to 150° C. under nitrogen. Thionyl chloride (10.1 g, 0.077 mole) was added and left refluxing for one hour at 90° C. Any excess thionyl chloride was removed by vacuum at 150° C. The vacuum was quenched with nitrogen, and hexanediol (4.5 g, 0.0385 mole) was added. After HCl evolution subsided, a vacuum was applied for 30 minutes. The tan bottom layer was collected and shown by NMR analysis to be a mixture of MeFOSE diester and MeFOSE-phthalate-(hexandiol-phthalate)$_n$-MeFOSE, where n (number of repeatable units) is 1. Thermal stability of this fluorochemical composition was determined using Test Methods Ia and Ib, and the results are shown in Table 1.

TABLE 1
Thermal Stability of Fluorochemical Compositions

| Ex. No. | Fluorochemical Composition | Number of Repeat-able Units (n) | Percent Remaining at 290° C. | Temperature with 97% Remaining | Temperature with 75% Remaining |
|---|---|---|---|---|---|
| 1 | 2:2:1 MeFOSE/ phthalate/ hexanediol | 0, 1, 2, and 3 or more | 88 | 180° C. | 320° C. |
| 2 | 2:2:1 MeFOSE/ phthalate/ hexanediol | 15% n = 1 85% n = 0 | 85 | 175° C. | 310° C. |

Table 1 shows that the fluorochemical composition containing oligomer with 2 or more repeat (polymerized) units exhibited an increase in thermal stability over the fluorochemical composition containing compound with only one repeatable unit.

Example 3
2:1:1:1 EtFOSE/IPC/TPC/Hexanediol Mixture of Fluorine-Containing Aromatic Ester Compounds and Oligomers with 0, 1, 2, and 3 or More Polymerized Units Toluene (20 g), isophthaloyl chloride (IPC) (25.4 g, 0.125 mole, 0.25 equivalent), terephthaloyl chloride (TPC) (25.4 g, 0.125 mole, 0.25 equivalent), and EtFOSE alcohol (142.7 g, 0.25 mole, 0.25 equivalent) were combined under a nitrogen atmosphere in a 1000 ml flask equipped with a condenser, stirrer, bubbler, and temperature controller. The temperature was increased to 120° C. slowly with stirring, and held at this level until HCl evolution stopped. 1,6-Hexanediol (HDO) (14.8 g, 0.125 mole, 0.25 equivalent) was added slowly with good stirring. The temperature was increased (but not above 210° C.) as needed to keep the product in liquid form until HCl evolution stopped (about 15–60 minutes). A vacuum of at least 508 mm Hg was then applied to the product for at least 30 minutes with the temperature held at a level sufficient to keep the mixture molten to remove residual HCl and toluene. Thermal stability of the resulting fluorochemical composition, made up of a mixture of fluorine-containing aromatic ester compounds and oligomers with 0, 1, 2, and 3 or more polymerized units (expected by analogy to Example 8 below), was determined using Test Method Ia and Ib, and the results are shown in Table 2. In addition, the average molecular weight of this fluorochemical composition was determined by NMR analysis and found to be about 1500 g/mole.

Example 4

The fluorochemical composition of Example 3 was again prepared and then separated into low and high molecular weight fractions using fractional precipitation. The fluorochemical composition was dissolved in hot ethyl acetate. Upon cooling, the higher molecular weight oligomers precipitated (Example 4 High MW) while the lower molecular weight stayed in solution. The solution was decanted from the precipitate and the ethyl acetate was removed. The solid recovered was Example 4 Low MW. The relative number average (Mn) and weight average (Mw) molecular weights of the fluorochemical composition of Example 3 and the low molecular weight fraction were determined by gel permeation chromatography (GPC). The GPC samples were prepared by dissolving 15 mg of each sample in 5.0 ml. of hexafluoroisopropanol (hfip). The solutions were shaken overnight, filtered with a 0.25 micron syringe filter and 75 microliters were injected into a two column set (2-Polymer Labs Mixed B) in the Waters 150C. Liquid Chromagraph. The 150C. operated at a temperature of 40° C., with the hfip as the eluent, flowing at 0.3 ml/min. The molecular weights were in polymethyl methacrylate (PMMA) units (polystyrenes, which are normally used were insoluble in hfip). The molecular weight range of the PMMA standards used was from 1.1E+06 down to 2.0E+3. The results are shown in Table 2. The thermal stabilities of the low and high molecular weight fractions were determined using Test Methods Ia and Ib, and the results are shown in Table 2.

HCl evolution stopped. 1,6-Hexanediol (HDO) (14.8 g, 0.125 mole, 0.25 equivalent) was added slowly with good stirring. The temperature was increased (but not above 210° C.) as needed to keep the product in liquid form until HCl evolution stopped (about 15–60 minutes). A vacuum of at least 508 mm Hg was then applied for at least 30 minutes to the product while still in liquid form to remove residual HCl and toluene. Thermal stability of the resulting fluorochemical composition, made up of a mixture of fluorine-containing aromatic ester compounds and oligomers with 0, 1, 2, and 3 or more polymerized units (expected by analogy to Example 8 below), was determined using Test Method Ia and Ib, and the results are shown in Table 3. In addition, the average molecular weight of this fluorochemical composition was determined by NMR analysis and found to be about 1500 g/mole.

TABLE 2

Thermal Stabilities and Relative Molecular Weights of Fluorochemical Compositions and Their Low and High Molecular Weight Fractions

| Ex. No. | Fluorochemical Composition | $M_w$ | $M_n$ | $M_w/M_n$ | Percent Remaining at 290° C. | Temperature with 97% Remaining | Temperature with 75% Remaining |
| --- | --- | --- | --- | --- | --- | --- | --- |
| 3 | 2:1:1:1 EtFOSE/IPC/ TPC/HDO | 715 | 515 | 1.39 | 97% | 295° C. | 350° C. |
| 4 | 2:1:1:1 EtFOSE/IPC/ TPC/HDO High MW | NR | NR | NR | 98% | 300° C. | 355° C. |
| 4 | 2:1:1:1 EtFOSE/IPC/ TPC/HDO Low MW | 675 | 453 | 1.49 | 84% | 185° C. | 325° C. |

MW = molecular weight.
$M_n$ = number average molecular weight.
$M_w$ = weight average molecular weight.
NR = not run, because the high molecular weight fraction was not sufficiently soluble to run the GPC experiment.

The results in Table 2 show that the fluorochemical composition and the high molecular weight fraction of the fluorochemical composition gave improved thermal stability compared with the thermal stability of the lower molecular weight fraction. In addition, when molecular weight distribution was calculated by dividing Mw by Mn, it could be seen that all of these compositions were mixtures of components with various molecular weights, since Mw/Mn was greater than 1. Monomeric compositions must have the same number average molecular weight and weight average molecular weight (Mw/Mn =1). For a text book discussion of molecular weight distribution, see Odian, G., Principles of Polymerization, $2^{nd}$ Ed., John Wiley & Sons, 1981, p 20.

Example 5

2:2:1 Telomer/IPC/Hexanediol Mixture of Fluorine-Containing Aromatic Ester Compounds and Oligomers with 0, 1, 2, and 3 or More Polymerized Units Toluene (20 g), isophthaloyl chloride (IPC) (50.8 g, 0.25 mole, 0.5 equivalent), and Zonyl™ BA(N) alcohol $(F(CF_2CF_2)_nCH_2CH_2OH)$ (128.5 g, 0.25mole, 0.25 equivalent) were combined under a nitrogen atmosphere in a 1000 ml flask equipped with a condenser, stirrer, bubbler, and temperature controller. The temperature was increased to 120° C. slowly with stirring, and held at this level until Example 6

The fluorochemical composition of Example 5 was again prepared and then separated into low and high molecular weight fractions using fractional precipitation. The fluorochemical composition was dissolved in hot ethyl acetate. Upon cooling, the higher molecular weight oligomers precipitated (Example 6 High MW) while the lower molecular weight stayed in solution. The solution was decanted from the precipitate and the ethyl acetate was removed. The solid recovered was Example 6 Low MW. The relative number average (Mn) and weight average (Mw) molecular weights of the fluorochemical composition of Example 5 and of the low and high molecular weight fractions were determined by gel permeation chromatography (GPC). The GPC samples were prepared by dissolving 15 mg of each sample in 5.0 ml. of hexafluoroisopropanol (hfip). The solutions were shaken overnight, filtered with a 0.25 micron syringe filter and 75 microliters were injected into a two column set (2-Polymer Labs Mixed B) in the Waters 150C. Liquid Chromagraph. The 150C. operated at a temperature of 40° C., with the hfip as the eluent, flowing at 0.3 ml/min. The molecular weights were in polymethyl methacrylate (PMMA) units (polystyrenes, which were normally used were insoluble in hfip). The molecular weight range of the PMMA standards was from 1.1E+06 down to 2.0E+3. The results are shown in Table 3. The thermal stabilities of the low and high molecular weight fractions were determined using Test Methods Ia and Ib, and the results are shown in Table 3.

$R_f$=perfluorooctyl and R=ethyl (Example 8) was analyzed by NMR. Proton and $^{13}C$ spectra were obtained. Two-dimensional NMR spectra unambiguously confirmed the presence of EtFOSE-IP-EtFOSE, HD-IP-EtFOSE or

TABLE 3

Thermal Stabilities and Relative Molecular Weights of Fluorochemical Compositions and Their Low and High Molecular Weight Fractions

| Ex. No. | Fluoro-chemical Composition | $M_w$ | $M_n$ | $M_w/M_n$ | Percent Remaining at 290° C. | Temperature with 97% Remaining | Temperature with 75% Remaining |
|---|---|---|---|---|---|---|---|
| 5 | 2:2:1 Zonyl ™ BA(N)/ IPC/HDO | 545 | 388 | 1.4 | 69% | 200° C. | 280° C. |
| 6 | 2:2:1 Zonyl ™ BA(N)/ IPC/HDO High MW | 3610 | 471 | 7.65 | 75% | 225° C. | 290° C. |
| 6 | 2:2:1 Zonyl ™ BA(N)/ IPC/HDO Low MW | 450 | 339 | 1.33 | 75% | 225° C. | 290° C. |

MW = molecular weight.
$M_n$ = number average molecular weight.
$M_w$ = weight average molecular weight.

The results in Table 3 show that the telomer based fluorochemical composition, as well as its high and low molecular weight fractions, were less thermally stable than the sulfonamido group-containing compositions shown in Table 2. It appears that the $R_f$ group attached by a divalent alkylene (—$CH_2CH_2$—) linkage is less thermally stable than an $R_f$ group attached by a sulfonamido (—$SO_2N$<) linkage, as the level of thermal stability exhibited by the sulfonamido group-containing fluorochemical compositions was not exhibited by the telomer compositions, regardless of the presence of oligomeric components. Further, the molecular weight distributions, calculated by dividing Mw by Mn (Mw/Mn), were found to be greater than 1. This confirmed that the telomer based fluorochemical compositions comprised a mixture of various molecular weight oligomers.

Example 7–9
2:2:1 $R_fSO_2N(R)CH_2CH_2OH$/IPC/Hexanediol Mixture of Fluorine-Containing Aromatic Ester Compounds and Oligomers with 0, 1, 2, and 3 or More Polymerized Units Toluene (20 g), isophthaloyl chloride (IPC) (50.8 g, 0.25 mole, 0.5 equivalent), and $R_fSO_2N(R)CH_2CH_2OH$ (0.25 mole, 0.25 equivalent) were combined under a nitrogen atmosphere in a 1000 ml flask equipped with a condenser, stirrer, bubbler, and temperature controller. The temperature was increased to 120° C. slowly with stirring, and held at this level until HCl evolution stopped. 1,6-Hexanediol (HDO) (14.8 g, 0.125 mole, 0.25 equivalent) was added slowly with good stirring. The temperature was increased (but not above 210° C.) as needed to keep the product in liquid form until HCl evolution stopped (about 15–60 minutes). A vacuum of at least 508 mm Hg was then applied to the product for at least 30 minutes to remove residual HCl and toluene. Thermal stability of the resulting fluorochemical compositions, each made up of a mixture of fluorine-containing aromatic ester compounds and oligomers with 0, 1, 2, and 3 or more polymerized units were determined using Test Methods Ia and Ib, and the results are shown in Table 4. The fluorochemical composition made with EtFOSE-IP-HD, and HD-IP-HD, where HD is hexanediol, and IP is isophthalate. This distribution is consistent with the above-stated reactant charge ratios. The HD-IP-HD structure must be present when more than one repeat unit is present (i.e. EtFOSE-IP-(HD-IP)-(HD-IP)-EtFOSE having two repeat units). The level of EtFOSE-IP-EtFOSE was determined directly from proton integration and found to be 29 molar % of the composition. The molar % of the components containing the HD-IP-HD structure must be the same, and as a result, oligomers having (HD-IP)n repeat units where n is 2 or more must also be 29%.

TABLE 4

Thermal Stabilities of Fluorochemical Compositions

| Ex. No. | $R_f$ Alcohol (g) | Fluorochemical Composition | Percent Remaining at 290° C. | Temperature with 97% Remaining | Temperature with 75% Remaining |
|---|---|---|---|---|---|
| 7 | MeFOSE alcohol (139.2) | 2:2:1 MeFOSE/IPC/HDO | 95% | 225 | 360 |
| 8 | EtFOSE alcohol (142.7) | 2:2:1 EtFOSE/IPC/HDO | 90% | 285 | 340 |
| 9 | MeFBSE (89.2) | 2:2:1 MeFBSE/IPC/HDO | 91% | 195 | 330 |

The results in Table 4 show that fluorochemical compositions comprising an $R_f$ group attached by the sulfonamide (—$SO_2N$<) linkage were more thermally stable than when the $R_f$ group was attached by a divalent alkylene (—$CH_2CH_2$—) linkage (Table 3, Example 5).

Example 10
2:3:2 MeFOSE/TPC/Hexanediol Mixture of Fluorine-Containing Aromatic Ester Compounds and Oligomers with 0, 1, 2, and 3 or More Polymerized Units Toluene (20 g), terephthaloyl chloride (76.2 g, 0.375 mole, 0.75 equivalent), and MeFOSE alcohol (139.2 g, 0.25 mole, 0.25 equivalent) were combined under a nitrogen atmosphere in a 1000 ml flask equipped with a condenser, stirrer, bubbler, and temperature controller. The temperature was increased to 120° C. slowly with stirring, and held at this level until HCl evolution stopped. 1,6-Hexanediol (118.4 g, 0.25 mole, 0.5 equivalent) was added slowly with good stirring. The temperature was increased (but not above 210° C.) as needed to keep the product in liquid form until HCl evolution stopped (about 15–60 minutes). A vacuum of at least 508 mm Hg was then applied to the product for at least 30 minutes to remove residual HCl and toluene. Thermal stability of the resulting fluorochemical composition, made up of a mixture of fluorine-containing aromatic ester compounds and oligomers with 0, 1, 2, and 3 or more polymerized units (expected by analogy to Example 8 above), was determined using Test Methods Ia and Ib, and the results are shown in Table 5.

Example 11

2:3:2 Telomer/TPC/Hexanediol Mixture of Fluorine-Containing Aromatic Ester Compounds and Oligomers with 0, 1, 2, and 3 or More Polymerized Units A fluorochemical composition was prepared essentially as in Example 10, except that Zonyl™ BA(N) alcohol $(F(CF_2CF_2)_nCH_2CH_2OH)$ (128.5 g, 0.25 mole, 0.25 equivalent) was substituted for MeFOSE. Thermal stability of the resulting fluorochemical composition, made up of a mixture of fluorine-containing aromatic ester compounds and oligomers with 0, 1, 2, and 3 or more polymerized units (expected by analogy to Example 8 above), was determined using Test Method Ia and Ib, and the results are shown in Table 5.

TABLE 5

Thermal Stability of Fluorochemical Compositions

| Ex. No. | Fluorochemical Composition | Percent Remaining at 290° C. | Temperature with 97% Remaining | Temperature with 75% Remaining |
|---|---|---|---|---|
| 10 | 2:3:2 MeFOSE/TPC/HDO | 96% | 265° C. | 365° C. |
| 11 | 2:3:2 Zonyl ™ BA(N)/ TPC/HDO | 84% | 215° C. | 320° C. |

The results in Table 5 show that fluorochemical compositions comprising an $R_f$ group attached by the sulfonamide (—SO$_2$N<) linkage were more thermally stable than when the $R_f$ group was attached by a divalent alkylene (—CH$_2$CH$_2$—) linkage.

Example 12

2:2:1 MeFOSE/TPC/PEG-300 Mixture of Fluorine-Containing Aromatic Ester Compounds and Oligomers with 0, 1, 2, and 3 or More Polymerized Units Terephthaloyl chloride (TPC) (20.3 g, 0.10 mole, 0.2 equivalent) was placed in a flask equipped with a nitrogen purge, condenser, stirrer, bubbler, and temperature controller. The TPC was heated to 120° C. and melted by heating the flask, and then PEG-300 (15 g, 0.05 mole, 0.1 equivalent) was added with stirring over a 5 minute period, resulting in evolution of HCl. The temperature was slowly increased, and MeFOSE (57 g, 0.10 mole, 0.10 equivalent) was added over a 15 minute period. Resulting product crystallized out, but as the temperature reached 230–240° C., the reaction mixture cleared. Foaming was broken up with vigorous stirring. After an additional 10 minutes, the resulting product was poured into an aluminum pan and cooled. Thermal stability of this fluorochemical composition, made up of a mixture of fluorine-containing aromatic ester compounds and oligomers with 0, 1, 2, and 3 or more polymerized units (expected by analogy to Example 8 above), was determined using Test Method Ia, and the results are shown in Table 6.

Example 13

2:2:1 EtFOSE/TPC/PEG-300 Mixture of Fluorine-Containing Aromatic Ester Compounds and Oligomers with 0, 1, 2, and 3 or More Polymerized Units Example 12 was essentially repeated except that EtFOSE (56.3 g, 0.10 mole, 0.1 equivalent) was substituted for MeFOSE. Thermal stability of the resulting fluorochemical composition, made up of a mixture of fluorine-containing aromatic ester compounds and oligomers with 0, 1, 2, and 3 or more polymerized units (expected by analogy to Example 8 above), was determined using Test Method Ia, and the results are shown in Table 6.

Example 14

2:3:2 EtFOSE/TPC/EG Mixture of Fluorine-Containing Aromatic Ester Compounds and Oligomers with 0, 1, 2, and 3 or More Polymerized Units EtFOSE (57.1 g, 0.10 mole, 0.1 equivalent), terephthaloyl chloride (TPC) (20.3 g, 0.10 mole, 0.2 equivalent), and methyl isobutyl ketone (50 g) were combined in a flask equipped with a nitrogen purge, condenser, stirrer, bubbler, and temperature controller, and heated with stirring at reflux for 3 hours. Ethylene glycol (EG) (6.6 g, 0.1 mole, 0.1 equivalent) was then added and reflux was continued for an additional 4 hours, followed by cooling. The resulting solid was reheated to reflux, and then further heated to 170° C., distilling out the methyl isobutyl ketone. After cooling to 145° C., isopropyl alcohol (150 ml) was added, forming a solution on mixing. With cooling, the resulting product crystallized out, and after filtration 31 grams of product was obtained. Thermal stability of this fluorochemical composition, made up of a mixture of fluorine-containing aromatic ester compounds and oligomers with 0, 1, 2, and 3 or more polymerized units (expected by analogy to Example 8 above), was determined using Test Method Ia, and the results are shown in Table 6.

Comparative Example C1

2:1 MeFOSE/TPC

MeFOSE (58.5 g, 0.105 mole) and terephthaloyl chloride (10.2 g, 0.0502 mole) were melted (80–100° C.) in a flask equipped with a nitrogen purge, condenser, stirrer, bubbler, and temperature controller. As HCl evolved, the temperature was raised to 230° C. to keep the product in liquid form and held at held at this level for 15 to 20 minutes. The resulting product was then poured into an aluminum pan and cooled. Thermal stability of this fluorine-containing aromatic ester compound was determined using Test Method Ia, and the results are shown in Table 6.

Comparative Examples C2–C3

Fluorochemical repellents FR-1 and FR-2 were subjected to thermal stability determinations using Test Method Ia, and the results are shown in Table 6.

TABLE 6

Thermal Stabilites of Fluorochemical Compositions

| Ex. No. | Fluorochemical Composition | Percent Remaining at 250° C. | Percent Remaining at 280° C. | Percent Remaining at 300° C. |
|---|---|---|---|---|
| 12 | 2:2:1 MeFOSE/TPC/PEG-300 | 97.9% | 97.1% | 95.4% |
| 13 | 2:2:1 EtFOSE/TPC/PEG-300 | 96.3% | 93.2% | 89.4% |
| 14 | 2:3:2 EtFOSE/TPC/EG | 98.7% | 96.9% | 95.0% |
| C1 | 2:1 MeFOSE/TPC | 94.2% | 93.2% | 92.2% |
| C2 | FR-1 oxazolidinone | 93.4% | 86.5% | 67.2% |
| C3 | FR-2 ester | 94.8% | 94% | 88% |

The results in Table 6 show that the fluorochemical compositions made up of mixtures of fluorine-containing aromatic ester compounds and oligomers with 0, 1, 2, and 3 or more polymerized units were found to be more thermally stable than the comparative fluorochemical compositions comprising aromatic ester compound or a prior art repellent (FR-1 or FR-2). Thermal stability greater than that of FR-1 (a fluorochemical oxazolidinone) is sometimes desired.

Example 15
2:3:2 MeFOSE/IPC/HDO Mixture of Fluorine-Containing Aromatic Ester Compounds and Oligomers with 0, 1, 2, and 3 or More Polymerized Units Example 10 was essentially repeated except that isophthaloyl chloride was used in place of the terephthaloyl chloride.

Comparative Example C4
2:1 MeFOSE/IPC

Comparative Example C1 was essentially repeated except that isophthaloyl chloride was used in place of terephthaloyl chloride.

Comparative Example C5
2:1 MeFOSE/PC

Comparative Example C1 was essentially repeated except that phthaloyl chloride was used in place of terephthaloyl chloride.

Example 16
2:2:1 MeFBSE/TPC/PEG-300 Mixture of Fluorine-Containing Aromatic Ester Compounds and Oligomers with 0, 1, 2, and 3 or More Polymerized Units Example 9 was essentially repeated except that PEG-300 (37.5 g, 0.125 mole, 0.25 equivalent) was used instead of hexanediol, and terephthaloyl chloride was used instead of isophthaloyl chloride.

Example 17
1:1:2:1 MeFOSE/EtFOSE/IPC/HDO Mixture of Fluorine-Containing Aromatic Ester Compounds and Oligomers with 0, 1, 2, and 3 or More Polymerized Units Example 7 was essentially repeated except that a mixture of MeFOSE (69.6g, 0.125 mole, 0.125 equivalent) and EtFOSE (71.3g, 0.125 mole, 0.125 equivalent) was used in place of the MeFOSE.

Example 18
1.5:0.5:2:1 MeFOSE/EtFOSE/IPC/HDO Mixture of Fluorine-Containing Aromatic Ester Compounds and Oligomers with 0, 1, 2, and 3 or More Polymerized Units Example 7 was essentially repeated except that a mixture of MeFOSE (104.4g, 0.187 mole, 0.187 equivalent) and EtFOSE (35.6g, 0.063 mole, 0.063 equivalent) was used in place of the MeFOSE.

Example 19
2:1:1:1 MeFOSE/PC/TPC/Hexanediol Mixture of Fluorine-Containing Aromatic Ester Compounds and Oligomers with 0, 1, 2, and 3 or More Polymerized Units A fluorochemical composition was made essentially as in Example 1 except that a mixture of phthaloyl chloride (25.4 g, 0.125 mole, 0.25 equivalent) and terephthaloyl chloride (25.4 g, 0.125 mole, 0.25 equivalent) was used in place of the phthaloyl chloride.

Example 20
2:2:1 MeFOSE/DMIP/HDO Mixture of Fluorine-Containing Aromatic Ester Compounds and Oligomers with 0, 1, 2, and 3 or More Polymerized Units Xylene (271 g), dimethylisothalate (DMIP) (97 g, 0.5 mole, 1 equivalent), 1,6-hexanediol (HDO) (29.5 g, 0.25 mole, 0.5 equivalent), and p-toluene sulfonic acid (pTSA) (7.9 g, 0.0416 mole) were combined under a nitrogen atmosphere in a 1000 ml, 3-neck flask equipped with a Dean-Stark trap with a condenser, stirrer, bubbler, and temperature controller. The temperature was increased to 145° C. with stirring, and held at this level while xylene and methanol slowly distilled at 60° C. to 90° C. for one hour. The neck of the Dean-Stark trap was held at approximately 90° C. with heat tape while methanol and xylene were being eliminated. MeFOSE alcohol (280 g, 0.5 mole) was added, and the reaction was held at 145° C. for 8 hours while methanol and xylene distilled at 60° C. to 90° C. Again the neck of the Dean-Stark trap was held at 90° C. with heat tape. The xylene was removed by vacuum (at least 508 mm Hg) distillation at 190° C., and the product was poured out into pans.

Example 21
2:2:1 MeFOSE/IPC/DEG Mixture of Fluorine-Containing Aromatic Ester Compounds and Oligomers with 0, 1, 2, and 3 or More Polymerized Units A fluorochemical composition was made essentially as in Example 7 except that di(ethylene glycol) (13.3 g, 0.125 mole, 0.25 equivalent) was used in place of hexanediol.

Example 22
2:2:1 MeFOSE/IPC/TMG Mixture of Fluorine-Containing Aromatic Ester Compounds and Oligomers with 0, 1, 2, and 3 or More Polymerized Units A fluorochemical composition was made essentially as in Example 7 except that 1,3-propanediol (trimethylene glycol, available from Aldrich Chemical Co., Milwaukee, Wis.) (9.5 g, 0.125 mole, 0.25 equivalent) was used in place of hexanediol.

Example 23
2:2:1 MeFOSE/IPC/NPG Mixture of Fluorine-Containing Aromatic Ester Compounds and Oligomers with 0, 1, 2, and 3 or More Polymerized Units A fluorochemical composition was made essentially as in Example 7 except that 2,2-dimethyl-1,3-propanediol (neopentyl glycol, available from Aldrich Chemical Co.) (13.0 g, 0.125 mole, 0.25 equivalent) was used in place of hexanediol.

Example 24
2:2:1 MeFOSE/TPC/PEG-600 Mixture of Fluorine-Containing Aromatic Ester Compounds and Oligomers with 0, 1, 2, and 3 or More Polymerized Units Toluene (20 g), terephthaloyl chloride (50.8 g, 0.25 mole, 0.5 equivalent), and MeFOSE alcohol (139.2 g, 0.25 mole, 0.25 equivalent) were combined under a nitrogen atmosphere in a 1000 ml flask equipped with a condenser, stirrer, bubbler, and temperature controller. The temperature was increased to 120° C. slowly with stirring, and held at this level until HCl evolution stopped. Poly(ethylene glycol) with a number average molecular weight of about 600 (PEG-600) (75 g, 0.125 mole, 0.25 equivalent) was added slowly with good stirring. The temperature was increased (but not above 250° C.) as needed to keep the product in liquid form (about 30 minutes).

Example 25
2:2:1 MeFOSE/TPC/PEG-900 Mixture of Fluorine-Containing Aromatic Ester Compounds and Oligomers with 0, 1, 2, and 3 or More Polymerized Units Example 24 was essentially repeated except that poly(ethylene glycol) with a number average molecular weight of about 900 (PEG-900) (112.5 g, 0.125 mole, 0.25 equivalent) was used in place of PEG-600.

Example 26
2:2:1 MeFOSE/TPC/PEG-1450 Mixture of Fluorine-Containing Aromatic Ester Compounds and Oligomers with 0, 1, 2, and 3 or More Polymerized Units Example 24 was essentially repeated except that poly(ethylene glycol) with a number average molecular weight about 1450 (PEG-1450) (181.2 g, 0.125 mole, 0.25 equivalent) was used in place of PEG-600.

Example 27
2:2:1 MeFOSE/TPC/PDEGP Mixture of Fluorine-Containing Aromatic Ester Compounds and Oligomers with 0, 1, 2, and 3 or More Polymerized Units Example 16 was essentially repeated except that polydiethylene glycol phthalate diol (PDEGP, having a molecular weight of 356, available from Aldrich Chemical Co.) (44.5 g, 0.125 mole, 0.25 equivalent) was used in place of PEG-600. Also, the solvent used for the reaction was o-dichlorobenzene instead of toluene. The reaction was allowed to proceed for 15 hours, then vacuum was applied at 180° C. to remove the solvent.

Example 28
2:2:1 MeFOSE/TPC/PDMS-Diol Mixture of Fluorine-Containing Aromatic Ester Compounds and Oligomers with 0, 1, 2, and 3 or More Polymerized Units Example 24 was essentially repeated except that polydimethylsiloxane diol (X-22-160AS, available from Shin-Etsu Chemical Co., Chiyodak, Tokyo, Japan, (125 g, 0.125 mole, 0.25 equivalent) was used in place of PEG-600.

Example 29
2:2:1 MeFOSE/TPC/PPG-425 Mixture of Fluorine-Containing Aromatic Ester Compounds and Oligomers with 0, 1, 2, and 3 or More Polymerized Units Example 24 was essentially repeated except that polypropylene glycol with average Mn ca. 425 (53.1 g, 0.125 mole, 0.25 equivalent) was used in place of PEG-600.

Example 30
2:2:1 MeFOSE/TPC/Dimer-Diol Mixture of Fluorine-Containing Aromatic Ester Compounds and Oligomers with 0, 1, 2, and 3 or More Polymerized Units Example 24 was essentially repeated except that Empol™ 1070 dimer diol (71.0 g, 0.125 mole, 0.25 equivalent) was used in place of PEG-600. Also, the solvent used for the reaction was o-dichlorobenzene instead of toluene. The reaction was allowed to proceed for 15 hours, then vacuum was applied at 180° C. to remove the solvent.

Example 31
2:2:1 MeFOSE/TPC/Tone Mixture of Fluorine-Containing Aromatic Ester Compounds and Oligomers with 0, 1, 2, and 3 or More Polymerized Units Example 24 was essentially repeated except that Tone™ 201 polycaprolactone (66.2 g, 0.125 mole, 0.25 equivalent) was used in place of PEG-600.

Example 32
1.5:2:1.25 MeFOSE/TPC/PEG-300 Mixture of Fluorine-Containing Aromatic Ester Compounds and Oligomers with 0, 1, 2, and 3 or More Polymerized Units Example 24 was essentially repeated except that the amount of MeFOSE used was 38.1 g (0.187 mole, 0.187 equivalent), and poly(ethylene glycol) with a number average molecular weight of about 300 (PEG-300) (46.9 g, 0.156 mole, 0.312 equivalent) was used in place of PEG-600.

Example 33
1:2:1.5 MeFOSE/TPC/PEG-300 Mixture of Fluorine-Containing Aromatic Ester Compounds and Oligomers with 0, 1, 2, and 3 or More Polymerized Units Example 24 was essentially repeated except that the amount of MeFOSE used was 25.4 g (0.125 mole, 0.125 equivalent), and PEG-300 (56.3 g, 0.187 mole, 0.375 equivalent) was used in place of PEG-600.

Example 34
1:7:6.5 MeFOSE/TPC/PEG-300 Fluorochemical Composition

Example 24 was essentially repeated except that the amount of MeFOSE used was 20 g (0.0357 mole, 0.0357 equivalent), and PEG-300 (69.6 g, 0.23 mole, 0.46 equivalent) was used in place of PEG-600.

Example 35
2:3:2 EtFOSE/AC/RES Fluorochemical Composition

To a 500 ml round bottom flask equipped with a heat source, an overhead stirrer, and a distillation head was added adipoyl chloride (AC) (54.9 g, 0.3 mole, 0.6 equivalent), which was then heated to 110° C. Resorcinol (RES) (22 g, 0.2 mole, 0.4 equivalent) was then added over about 30 minutes in small aliquots as solid. With each addition there was a strong evolution of HCl gas, which settled within one minute of the solids addition. EtFOSE (110.8 g, 0.2 mole, 0.2 equivalent) was melted and added drop-wise over 45 minutes, with slow evolution of HCl gas. Although the temperature was increased to 170° C. over 20 minutes; the reaction mixture did not clear completely. The mixture was then subjected to a vacuum of about 635 mm Hg for 15 minutes, and the resulting liquid was poured in pans and cooled, forming a whitish solid. Thermal stability of this fluorochemical composition was determined, using Test Methods Ia and Ib. The weight percent remaining at 290° C. was 95.7. The temperatures at which 97 and 75 weight % remained were 275° C. and and 340° C., respectively.

Examples 36–37 and Comparative Examples C6–C9

The fluorochemical composition of Example 12 was incorporated into polyethylene terephthalate 65–1000 melt blown fibers, which were processed into a nonwoven fabric essentially according to the melt-blown extrusion procedure described in U.S. Pat. No. 5,300,357 (Gardiner), column 10, which is incorporated herein by reference. For comparison, polyethylene terephthalate 65–1000 melt blown fibers without the fluorochemical composition were processed into a nonwoven fabric as well. The extruder used was a Brabender 42 mm conical twin screw extruder, with maximum extrusion temperature of 280° C. and distance to the collector of 6 inches (15.2 cm).

The fluorochemical composition and polyethylene terephthalate 65–1000 in powder form were mixed by blending in a paperboard container using a mixer head affixed to a hand drill for about one minute until a visually homogeneous mixture was obtained. The fluorochemical composition was dispersed in the molten polyethylene terephthalate by mixing in the melt extrusion apparatus just prior to melt blowing. The weight percent of the compound in the polyethylene terephthalate 65–1000 was 2%.

The process conditions for each mixture were the same, including the melt blowing die construction used to blow the microfiber web, the basis weight of the web (50±5 g/m$^2$) and the diameter of the microfibers (20 micrometers). The extrusion temperature was 280–300° C., the primary air temperature was 270° C., the pressure was 124 kPa (18 psi), with a 0.076 cm air gap width, and the polymer throughput rate was about 180 g/hr/cm.

The resulting melt blown polyethylene terephthalate 65–1000 fabric made with and without the fluorochemical composition of Example 12 was evaluated for water and oil repellency using Test Methods II and III. Results are shown in Tables 7 and 10.

The above procedure was repeated using the fluorochemical compositions of Example 14 and Comparative Examples C1, C2, and C3. The water and oil repellency test results are shown in Table 7.

TABLE 7

Water and Oil Repellency of Polyester (PET) Melt Blown Non-Wovens Containing Fluorochemical Compositions

| Ex. No. | Fluorochemical Composition (Weight % in PET) | Repellency | | Repellency After 5 min. @ 100° C. | |
|---|---|---|---|---|---|
| | | Water | Oil | Water | Oil |
| 36 | 2:2:1 MeFOSE/TPC/PEG-300 (2%) (Example 12) | 4 | 4 | 6 | 3 |
| 37 | 2:3:2 EtFOSE/TPC/EG (2%) (Example 14) | 5 | 3 | 8 | 5 |
| C6 | 2:1 MeFOSE/TPC (2%) (Comp. Ex. C1) | 2 | 2 | 3 | 2 |
| C7 | FR-1 oxazolidinone (2%) (Comp. Ex. C2) | 4 | 1 | 9 | 5 |
| C8 | FR-2 ester (2%) (Comp. Ex. C3) | 3 | 0 | 3 | 1 |
| C9 | None | 0 | 0 | 1 | 0 |

The results in Table 7 show that melt blown non-wovens containing fluorochemical compositions of the invention (Examples 36 and 37) exhibited significantly better repellency than those containing no fluorochemical composition (Comparative Example C9) or containing a comparative fluorochemical composition comprising fluorine-containing aromatic ester compound (Comparative Example C6). In addition, the non-wovens containing fluorochemical compositions of the invention (Examples 36 and 37) exhibited similar or better repellency than those containing comparative fluorochemical compositions comprising prior art fluorochemical repellents (Comparative Examples C7 and C8), which also exhibited less thermal stability than the fluorochemical compositions of the invention (Table 6).

Examples 38–40 and Comparative Examples C10–C11

The fluorochemical compositions of Examples 1, 2, and 15, and Comparative Examples C4 and C5 were incorporated into melt blown non-wovens and tested essentially as described in Examples 36–37 and Comparative Examples C6–C8. The results are shown in Table 8.

TABLE 8

Water and Oil Repellency of Polyester (PET) Melt Blown Non-Wovens Containing Fluorochemical Compositions

| Ex. No. | Fluorochemical Composition (Weight % in PET) | Repellency | | Repellency After 5 min. @ 120° C. | |
|---|---|---|---|---|---|
| | | Water | Oil | Water | Oil |
| 38 | 2:2:1 MeFOSE/Phthalate/HDO (2%) (Example 1) | 8 | 6 | 8 | 7 |
| 39 | 2:2:1 MeFOSE/Phthalate/HDO (2%) (0 and 1 Repeatable Unit, Example 2) | 6 | 4 | 7 | 6 |
| C10 | 2:1 MeFOSE/PC (2%) (Comp. Ex. C5) | 3 | 2 | 7 | 6 |
| 40 | 2:3:2 MeFOSE/IPC/HDO (2%) (Example 15) | 6 | 3 | 9 | 7.5 |
| C11 | 2:1 MeFOSE/IPC (2%) (Comp. Ex. C4) | 3 | 2 | 7 | 6 |

The results in Table 8 show that a fluorochemical composition comprising fluorine-containing aromatic ester oligomers having more than one polymerized or repeat unit (Examples 38 and 40) provided better repellency than a fluorochemical composition comprising fluorine-containing aromatic ester compounds having zero and one repeatable unit, respectively (Example 39). In addition, the fluorochemical compositions of the invention (Examples 38–40) were found to provide more repellency than the comparative fluorochemical compositions (zero repeatable units) (Comparative Examples C10 and C11).

Examples 41–46

The fluorochemical compositions of Examples 3–6 were incorporated into melt blown non-wovens and tested essentially as described in Examples 36–37. The results are shown in Table 9. The results with the fluorochemical composition of Example 5 are shown also in Table 10.

TABLE 9

Water and Oil Repellency of Polyester (PET) Melt Blown Non-wovens Containing Fluorochemical Compositions

| Ex. No. | Fluorochemical Composition (Weight % in PET) | Repellency | | Repellency After 5 min. @ 120° C. | |
|---|---|---|---|---|---|
| | | Water | Oil | Water | Oil |
| 41 | 2:2:1 Telomer/IPC/HDO (2%) (Example 5) | 7 | 4 | 8 | 5 |
| 42 | Low MW Fraction of 2:2:1 Telomer/IPC/HDO (2%) (Example 6) | 7 | 4 | 9 | 7 |
| 43 | High MW Fraction of 2:2:1 Telomer/IPC/HDO (2%) (Example 6) | 7 | 5 | 8 | 6 |

TABLE 9-continued

Water and Oil Repellency of Polyester (PET) Melt Blown Non-wovens Containing Fluorochemical Compositions

| Ex. No. | Fluorochemical Composition (Weight % in PET) | Repellency | | Repellency After 5 min. @ 120° C. | |
|---|---|---|---|---|---|
| | | Water | Oil | Water | Oil |
| 44 | 2:1:1:1 EtFOSE/IPC/TPC/HDO (2%) (Example 3) | 7 | 4 | 8 | 5 |
| 45 | Low MW Fraction of 2:1:1:1 EtFOSE/IPC/TPC/HDO (2%) (Example 4) | 5 | 4 | 8 | 5 |
| 46 | High MW Fraction of 2:1:1:1 EtFOSE/IPC/TPC/HDO (2%) (Example 4) | 5 | 3 | 8 | 5 |

The results in Table 9 show that the high molecular weight fractions (Examples 43 and 46) containing the greater amounts of fluorine-containing aromatic ester oligomers having at least two repeat units (and the lesser amounts of aromatic ester compounds having zero or one repeatable unit), in spite of their higher molecular weights, surprisingly provided essentially the same repellency as the low molecular weight fractions (Examples 42 and 45), which contained the greater amounts of aromatic ester compounds having zero or one repeatable unit.

Examples 47–53

The fluorochemical compositions of Examples 7–9, 13, and 16–18 were incorporated into melt blown non-wovens and tested essentially as described in Examples 36–37. The results are shown in Table 10.

TABLE 10

Water and Oil Repellency of Polyester (PET) Melt Blown Non-wovens Containing Fluorochemical Compositions

| Ex. No. | Fluorochemical Composition (Weight % in PET) | Repellency | | Repellency After 5 min. @ 120° C. | |
|---|---|---|---|---|---|
| | | Water | Oil | Water | Oil |
| 41 | 2:2:1 Telomer/IPC/HDO (2%) (Example 5) | 7 | 4 | 8 | 5 |
| 47 | 2:2:1 MeFOSE/IPC/HDO (2%) (Example 7) | 8 | 6 | 10 | 8 |
| 48 | 2:2:1 EtFOSE/IPC/HDO (2%) (Example 8) | 7 | 6 | 8 | 6 |
| 49 | 2:2:1 MePBSE/IPC/HDO (2%) (Example 9) | 5 | 5 | 7 | 6 |
| 50 | 1.5:0.5:2:1 MeFOSE/EtFOSE/IPC/HDO (2%) (Example 18) | 8 | 6 | 8 | 7 |
| 51 | 1:1:2:1 MeFOSE/EtFOSE/IPC/HDO (2%) (Example 17) | 3 | 2 | 7 | 6 |
| 36 | 2:2:1 MeFOSE/TPC/PEG-300 (2%) (Example 12) | 4 | 4 | 6 | 7 |
| 52 | 2:2:1 EtFOSE/TPC/PEG-300 (2%) (Example 13) | 4.5 | 3 | NR | NR |
| 53 | 2:2:1 MePBSE/TPC/PEG-300 (2.5%) (Example 16) | 2 | 1 | 9 | 7.5 |

The results in Table 10 show that the presence of various fluorine-containing end groups and combinations of fluorine-containing end groups in the components of the fluorochemical compositions provided repellency-imparting characteristics, and that the presence of the perfluorooctyl moiety resulted in greater repellency than the presence of the perfluorobutyl moiety.

Examples 54–56

The fluorochemical compositions of Examples 1, 19, and 20 were incorporated into melt blown non-wovens and tested essentially as described in Examples 36–37. The results are shown in Table 11.

TABLE 11

Water and Oil Repellency of Polyester (PET) Melt Blown Non-Wovens Containing Fluorochemical Compositions

| Ex. No. | Fluorochemical Composition (Weight % in PET) | Repellency | | Repellency After 5 min. @ 120° C. | |
|---|---|---|---|---|---|
| | | Water | Oil | Water | Oil |
| 54 | 2:2:1 MeFOSE/PA/HDO (2%) (Example 1) | 8 | 6 | 8 | 7 |
| 55 | 2:1:1:1 EtFOSE/PC/TPC/HDO (2%) (Example 19) | 7 | 6 | 8 | 7 |
| 56 | 2:2:1 MeFOSE/DMIP/HDO (2%) (Example 20) | 8 | 6 | 9 | 7 |

The results in Table 11 show that non-wovens containing fluorochemical compositions derivable from aromatic dicarboxylic acids having carboxylic acid group substitution that is ortho (Example 54), meta (Example 56), or both ortho and para (Example 55) all exhibited excellent repellency.

Examples 57–67

The fluorochemical compositions of Examples 21–31 were incorporated into melt blown non-wovens and tested essentially as described in Examples 36–37. The results are shown in Table 12.

TABLE 12

Water and Oil Repellency of Polyester (PET) Melt Blown Non-Wovens Containing Fluorochemical Compositions

| Ex. No. | Fluorochemical Composition (Weight % in PET) | Repellency | | Repellency After 5 min. @ 120° C. | |
|---|---|---|---|---|---|
| | | Water | Oil | Water | Oil |
| 57 | 2:2:1 MeFOSE/IPC/DEG (2%) (Example 21) | 8 | 6 | 10 | 7 |
| 58 | 2:2:1 MeFOSE/IPC/TMG (2%) (Example 22) | 9 | 6 | 9 | 7 |
| 59 | 2:2:1 MeFOSE/IPC/NPG (2%) (Example 23) | 7 | 5 | 9 | 7.5 |
| 60 | 2:2:1 MeFOSE/TPC/PEG-600 (2%) (Example 24) | 3 | 2 | 9 | 6 |
| 61 | 2:2:1 MeFOSE/TPC/PEG-900 (2%) (Example 25) | 2 | 1 | 5 | 5 |
| 62 | 2:2:1 MeFOSE/TPC/PEG-1450 (2%) (Example 26) | 2 | 1 | 3 | 4 |
| 63 | 2:2:1 MeFOSE/TPC/PDEGP (2%) (Example 27) | 3 | 2 | 8 | 7 |
| 64 | 2:2:1 MeFOSE/TPC/PDMS-Diol (2%) (Example 28) | 3 | 1 | 5 | 4 |
| 65 | 2:2:1 MeFOSE/TPC/PPG-425 (2%) (Example 29) | 3 | 1.5 | 6 | 5 |
| 66 | 2:2:1 MeFOSE/TPC/Dimer-Diol (2%) (Example 30) | 2.5 | 0 | 4 | 3 |
| 67 | 2:2:1 MeFOSE/TPC/Tone (2%) (Example 31) | 3 | 2 | 9 | 8 |

The results in Table 12 show that the non-wovens containing fluorochemical compositions derived from a variety of different polyols all exhibiteded repellency characteristics. The best repellency was found when di(ethylene glycol), trimethylene glycol, neopentyl glycol, or hexanediol (Table 10) were used to make the fluorochemical compositions. When a series of polyols having similar structures, but increasing molecular weights were used, fluorochemical compositions derived from the lower molecular weight polyols imparted greater repellency to the non-wovens than did fluorochemical compositions derived from the higher molecular weight polyols.

Examples 68–70

The fluorochemical compositions of Examples 32 and 33 were incorporated into melt blown non-wovens and tested essentially as described in Examples 36–37. The results are shown in Table 13. The fluorochemical composition of Example 34 was combined at 2.5 weight percent with PET 65-1000 in powder form essentially as in Examples 36–37. The resulting mixture was pelletized by extrusion at about 260° C. into a string, quenched in water, and chopped into pellets. The resulting pellets were mixed with an equal weight of PET 65-1000 pellets containing no fluorochemical composition and converted into a meltblown fabric containing 1.25 weight % fluorochemical composition and tested essentially as in Examples 36–37. The results are shown in Table 13.

TABLE 13

Water and Oil Repellency of Polyester (PET) Melt Blown Non-Wovens Containing Fluorochemical Compositions

| Ex. No. | Fluorochemical Composition (Weight % in PET) | Repellency | | Repellency After 5 min. @ 120° C. | |
|---|---|---|---|---|---|
| | | Water | Oil | Water | Oil |
| 68 | 1.5:2:1.25 MeFOSE/TPC/PEG-300 (2%) (Example 32) | 3 | 2 | 9 | 7 |
| 69 | 1:2:1.5 MeFOSE/TPC/PEG-300 (2%) (Example 33) | 2 | 0 | 9 | 6 |
| 70 | 1:7:6.5 MeFOSE/TPC/PEG-300 (1.25%) (Example 34) | 2 | 0 | 7 | 8 |

The results in Table 13 show that when various ratios of fluorochemical alcohol, aromatic dicarboxylic acid, and polyol were employed in making the fluorochemical compositions, repellency was achieved in all the non-wovens containing the resulting fluorochemical compositions.

Example 71

The fluorochemical composition of Example 35 was incorporated into a melt blown non-woven and tested essentially as described in Example 36–37. The results are shown in Table 14.

TABLE 14

Water and Oil Repellency of Polyester (PET) Melt Blown Non-wovens Containing a "Reverse Ester" Fluorochemical Composition

| Ex. No. | Fluorochemical Composition (Weight % in PET) | Repellency | | Repellency After 5 min. @ 120° C. | |
|---|---|---|---|---|---|
| | | Water | Oil | Water | Oil |
| 71 | 2:3:2 EtFOSE/AC/RES (2%) (Example 35) | 7 | 5 | 7 | 6 |

The results in Table 14 show that a fluorochemical composition made from an aromatic alcohol imparted very good repellency to a polyester non-woven.

Example 72

Example 52 was essentially repeated except that 2.2 weight % of the fluorochemical composition (Example 13, 2:2:1 EtFOSE/TPC/CW 300) in the polyester was used instead of 2%. Results are shown in Table 15.

Example 73

The fluorochemical composition of Example 13 (2:2:1 EtFOSE/TPC/PEG-300) was combined with polyethylene terephthalate 65–1000 in powder form essentially as in Example 36–37. The resulting mixture was pelletized by extrusion at approximately 260° C. into a string, quenched in water, and chopped into pellets. The resulting polyethylene terephthalate pellets containing the fluorochemical composition were converted into a melt blown fabric and tested essentially as in Examples 36–37. The results are shown in Table 15.

TABLE 15

Water and Oil Repellency of Polyester (PET) Melt Blown Non-Wovens Containing Fluorochemical Compositions

| Ex. No. | Fluorochemical Composition (Weight % in PET) | Repellency | | Repellency After 5 min. @ 120° C. | |
|---|---|---|---|---|---|
| | | Water | Oil | Water | Oil |
| 72 | 2:2:1 EtFOSE/TPC/PEG-300 (2.2%) (Example 13) | 3 | 2 | 8 | 6 |
| 73 | 2:2:1 EtFOSE/TPC/PEG-300 (2.2%) (Example 13), precompounded into pellets with 65-1000 | 6 | 5 | 5 | 6 |

Table 15 shows that a nonwoven fabric made from precompounded polyester pellets containing the fluorochemical composition exhibited greater repellency without heat treatment than a corresponding fabric made directly from a mixture of the polyester and fluorochemical composition.

Examples 74–78 and Comparative Examples C12

The fluorochemical compositions of Examples 12 and 13 were incorporated into polyurethane (PS 440-200) melt blown fibers, and processed into nonwoven fabrics essentially as in Examples 36–37, using 1.0 and 1.5 weight % of the fluorochemical compositions without and with the addition of 5 weight % polybutylene (PB 0400). For comparison, polyurethane (PS 440-200) melt blown fibers without the fluorochemical composition were processed into a nonwoven fabric in essentially the same way. The resulting nonwoven fabrics were tested for repellency using Test Methods II and m, and the results are shown in Table 16.

TABLE 16

Water and Oil Repellency of Polyurethane (PU) Melt Blown Non-Wovens Containing Fluorochemical Compositions

| Ex. No. | Fluorochemical Composition (Weight % in PU) | Repellency | |
|---|---|---|---|
| | | Water | Oil |
| 74 | 2:2:1 EtFOSE/TPC/PEG-300 (1.5%) (Example 13) | 7 | 7 |

TABLE 16-continued

Water and Oil Repellency of Polyurethane (PU) Melt Blown Non-Wovens Containing Fluorochemical Compositions

| Ex. No. | Fluorochemical Composition (Weight % in PU) | Repellency Water | Repellency Oil |
|---|---|---|---|
| 75 | 2:2:1 EtFOSE/TPC/PEG-300 (1.5%) (Example 13), with 5 weight % PB 0400 | 3 | 7 |
| 76 | 2:2:1 EtFOSE/TPC/PEG-300 (1.0%) (Example 13) | 3 | 6 |
| 77 | 2:2:1 MeFOSE/TPC/PEG-300 (1.5%) (Example 12) | 10 | 7 |
| 78 | 2:2:1 MeFOSE/TPC/PEG-300 (1.5%) (Example 12), with 5 weight % PB 0400 | 10 | 8 |
| C12 | None | 2 | 0 |

The results in Table 16 show that polyurethane melt blown nonwoven fabrics containing the fluorochemical compositions were found to have good to excellent repellency over a range of fluorochemical composition concentrations, both with and without added polybutylene.

Example 79 and Comparative Example C13

Spunbond non-woven fabrics made with sheath/core (in 33/66 ratio) fibers were prepared essentially as described in U.S. Pat. No. 5,688,468 (Lu). Fibers were made without and with 2 weight % of the fluorochemical composition of Example 13 in 0.61 inherent viscosity polyethylene terephthalate (65–1000) in the sheath portion of the fibers. The resulting fabrics were tested for repellency according to Test Methods II and III, and the results are shown in Table 17.

TABLE 17

Water and Oil Repellency of Polyester Sheath/Core Spunbond Non-Wovens with and without Fluorochemical Compositions

| Ex. No. | Fluorochemical Composition (Weight % in Sheath) | Repellency Water | Repellency Oil | Repellency After 10 min. @ 154° C. Water | Repellency After 10 min. @ 154° C. Oil |
|---|---|---|---|---|---|
| 79 | 2:2:1 EtFOSE/TPC/PEG-300 (2%) (Example 13) | 4 | 3 | 6 | 7 |
| C13 | None | 1 | 0 | 1 | 0 |

Table 17 shows that repellency was exhibited by a spunbond non-woven fabric containing the fluorochemical composition in the sheath layer of the fibers of the spunbond non-woven fabric.

Examples 80–81 and Comparative Example C14

Polyethylene terephathalate 65–100 pellets (0.61 inherent viscosity) were coated with a toluene solution containing 10–50 weight % fluorochemical composition of Example 12, and the toluene was evaporated. Film, having a thickness of 0.18 mm, was made on a Haake single screw extruder equipped with a 20.3 cm die. The Haake zone temperatures were 480F., 490F., and 510F. with die temperature at 525F. Screw speed was constant at 150 RPM. The PET was quenched using a chilled (50° C.) nip roll. Film take up speed varied between 200 and 250 cm per minute depending on the sample. Additional films were made essentially as above with the fluorochemical composition of Example 14, and with no coating of fluorochemical composition on the pellets. The resulting films were tested for advancing and receding water contact angles and advancing and receding hexadecane contact angles, using Test Method IV. The films were also tested for peel force, using Test Method V. The results are shown in Tables 18 and 19.

TABLE 18

Advancing and Receding Contact Angles of Polyester (PET) Films without and with a Fluorochemical Composition

| Ex. No. | Fluorochemical Composition (Weight % in PET) | AWCA | RWCA | AHCA | RHCA |
|---|---|---|---|---|---|
| 80 | 2:2:1 MeFOSE/TPC/PEG-300 (1.14%) (Example 12) | 109 | 74.0 | 62.7 | 33.6 |
| 81 | 2:3:2 EtFOSE/TPC/EG (0.6%) (Example 14) | 94.8 | 57.6 | 67.6 | 65.5 |
| C14 | None | 85.8 | 84.8 | 0 | 0 |

AWCA = advancing water contact angle.
RWCA = receding water contact angle.
AHCA = advancing hexadecane contact angle.
RHCA = receding hexadecane contact angle.

The results in Table 18 show that the presence of the fluorochemical compositions caused a significant increase in all but the receding water contact angles.

TABLE 19

Peel Force of Tape from Polyester (PET) Films With and Without a Fluorochemical Composition

| Ex. No. | Fluorochemical Composition (Weight % in PET) | 232 Tape Peel Force (oz./in.) | 810 Tape Peel Force (oz./in.) |
|---|---|---|---|
| 80 | 2:2:1 MeFOSE/TPC/PEG-300 (1.14%) (Example 12) | 11.9 | 1.61 |
| C14 | None | 35.7 | 9.66 |

The results in Table 19 show that the fluorochemical composition reduced the peel force of tapes significantly from that found when the fluorochemical composition was not present.

Various modifications and alterations of this invention will become apparent to those skilled in the art without departing from the scope and spirit of this invention.

What is claimed is:

1. A fluorochemical composition comprising at least one fluorine-containing, aromatic ester compound or oligomer represented by one of the following formulas:

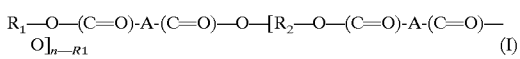

$$R_1\text{—O—}(C{=}O)\text{-A-}(C{=}O)\text{—O—}[R_2\text{—O—}(C{=}O)\text{-A-}(C{=}O)\text{—O}]_{n-R_1} \quad (I)$$

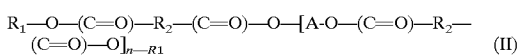

$$R_1\text{—O—}(C{=}O)\text{—}R_2\text{—}(C{=}O)\text{—O—}[A\text{-O—}(C{=}O)\text{—}R_2\text{—}(C{=}O)\text{—O}]_{n-R_1} \quad (II)$$

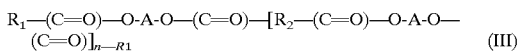

$$R_1\text{—}(C{=}O)\text{—O-A-O—}(C{=}O)\text{—}[R_2\text{—}(C{=}O)\text{—O-A-O—}(C{=}O)]_{n-R_1} \quad (III)$$

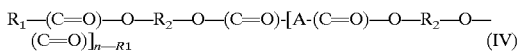

$$R_1\text{—}(C{=}O)\text{—O—}R_2\text{—O—}(C{=}O)\text{—}[A\text{-}(C{=}O)\text{—O—}R_2\text{—O—}(C{=}O)]_{n-R_1} \quad (IV)$$

wherein $R_1$ is the residue of at least one fluorine-containing, sulfonamido-group-containing monoalcohol, fluorine-containing, sulfonamido-group-containing monocarboxylic acid, or fluorine-containing, sulfonamido-group-containing monocarboxylic acid derivative; A and $R_2$ independently comprise at least one aliphatic, heteroaliphatic, saturated alicyclic, saturated heteroalicyclic, aromatic, heteroaromatic, or polymeric moiety; and n is 2–20; with the proviso that A and/or $R_2$ comprises an aromatic or heteroaromatic moiety that is directly ring-bonded to the adjacent ester groups shown in Formulas I–IV.

2. The fluorochemical composition of claim 1 in which $R_2$ is a divalent aliphatic, saturated alicyclic, aromatic, aliphatic polyester, polydialkylsiloxane, or poly(oxyalkylene) moiety.

3. The fluorochemical composition of claim 2 in which $R_2$ is a divalent aliphatic, aromatic, aliphatic polyester, polydimethylsiloxane, or poly(oxyalkylene) moiety.

4. The fluorochemical composition of claim 3 in which $R_2$ is hexylene, ethylene, propylene, neopentylene, ethyleneoxyethylene, bis(ethyleneoxycarbonyl)phenylene, polycaprolactone, polyoxyethylene, polyoxypropylene, or polydimethylsiloxane.

5. The fluorochemical composition of claim 1 wherein n is in the range of 2–10.

6. The fluorochemical composition of claim in which the fluorine-containing, sulfonamido-group-containing monocarboxylic acid residue is derived from a composition selected from the group consisting of:

2-(N-(ethyl)perfluorooctanesulfonamido)acetic acid,
2-(N-(ethyl)perfluorohexanesulfonamido)acetic acid,
2-(N-(ethyl)perfluorobutanesulfonamido)acetic acid,
2-(N-(ethyl)perfluorodecanesulfonamido)acetic acid,
2-(N-(ethyl)perfluorododecanesulfonamido)acetic acid,
2-(N-(methyl)perfluorooctanesulfonamido)acetic acid, and
2-(N-(methyl)perfluorobutanesulfonamido)acetic acid, and mixtures thereof.

7. The fluorochemical composition of claim 1 in which the fluorine-containing, sulfonamido-group-containing monoalcohol residue is derived from a composition selected from the group consisting of:

2-(N-ethylperfluorooctanesulfonamido)ethanol,
2-(N-methylperfluorooctanesulfonamido)ethanol,
2-(N-butylperfluorooctanesulfonamido)ethanol,
2-(N-methylperfluorobutanesulfonamido)ethanol,
2-(N-n-propylperfluorodecanesulfonamido)ethanol,
2-(N-ethylperfluorobutanesulfonamido)ethanol,
N-ethyl-N-(2-hydroxyethyl)perfluoroheptanamide, and mixtures thereof.

* * * * *

UNITED STATES PATENT AND TRADEMARK OFFICE
CERTIFICATE OF CORRECTION

PATENT NO.     : 6,960,642 B2
DATED          : November 1, 2005
INVENTOR(S)    : Jariwala, Chetan P.

It is certified that error appears in the above-identified patent and that said Letters Patent is hereby corrected as shown below:

Column 1,
Line 4, after "divisional" insert -- application of --.
Line 59, after "polyesters" insert -- . --.

Column 7,
Line 21, delete "$R_f(CH_2CH(CH_3)S(CH_2)_2OH$" and insert
-- $R_fCH_2CH(CH_3)S(CH_2)_2OH$ --.

Column 8,
Line 22, delete "4-bis(perfluoroisopropyl)" and insert -- 4-(bis(perfluoroisopropyl) --.
Line 25, delete "11-(N-ethyl)" and insert -- 11-(N-methyl) --.

Column 13,
Line 32, delete "-thereof." and insert -- thereof. --.

Column 14,
Line 5, delete "an-organic" and insert -- an organic --.
Line 39, delete "or, emulsions.>" and insert -- or emulsions. --.

Column 15,
Line 65, after "position can be" delete "Is".

Column 16,
Line 48, delete "et at.)." and insert -- et al.). --.
Line 65, after "Ohio" insert -- . --.

Column 17,
Line 62, delete "perferably" and insert -- preferably --.

Column 18,
Line 48, delete "FR-I" and insert -- FR-1 --.

Column 27,
Line 4, delete "to-thermal" and insert -- to thermal --.

Column 34,
Line 66, delete "exhibiteded" and insert -- exhibited --.

UNITED STATES PATENT AND TRADEMARK OFFICE
CERTIFICATE OF CORRECTION

PATENT NO. : 6,960,642 B2
DATED : November 1, 2005
INVENTOR(S) : Jariwala, Chetan P.

It is certified that error appears in the above-identified patent and that said Letters Patent is hereby corrected as shown below:

Column 36,
Line 55, delete "m" and insert -- III, --.

Column 39,
Line 22, delete "polyo xypropylene" and insert -- polyoxypropylene --.
Line 26, after "claim" insert -- 1 --.

Column 40,
Line 3, delete "perfluorooctanesulfonaniido" and insert
-- perfluorooctanesulfonamido --.
Line 5, delete "perfluorobutanesulfonaniido" and insert
-- perfluorobutanesulfonamido --.
Line 20, delete "butylperfluorooctanesulfonaniido" and insert
-- butylperfluorooctanesulfonamido --.
Line 22, delete "propylperfluorodecanesulfonaniido" and insert
-- propylperfluorodecanesulfonamido --.

Signed and Sealed this

Sixth Day of June, 2006

JON W. DUDAS
*Director of the United States Patent and Trademark Office*